United States Patent
Ha et al.

(10) Patent No.: US 12,242,281 B2
(45) Date of Patent: Mar. 4, 2025

(54) METHOD AND APPARATUS FOR PERFORMING PLATOONING OF THE MOVING OBJECT

(71) Applicants: Hyundai Motor Company, Seoul (KR); Kia Motors Corporation, Seoul (KR); Ajou University Industry-Academic Cooperation Foundation, Suwon-si (KR)

(72) Inventors: Jae Jun Ha, Hwaseong-si (KR); Ilsoo Yun, Yongin-si (KR); Sangmin Park, Yesan-gun (KR); Sungho Park, Yongin-si (KR); Harim Jeong, Suwon-si (KR); Cheolwoo Kwon, Suwon-si (KR); Jiwon Kim, Suwon-si (KR); Kiyeon Park, Suwon-si (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 172 days.

(21) Appl. No.: 17/159,433

(22) Filed: Jan. 27, 2021

(65) Prior Publication Data

US 2021/0240203 A1 Aug. 5, 2021

(30) Foreign Application Priority Data

Jan. 30, 2020 (KR) .......................... 10-2020-0011140

(51) Int. Cl.
G05D 1/00 (2024.01)
G08G 1/00 (2006.01)

(52) U.S. Cl.
CPC ......... *G05D 1/0297* (2013.01); *G05D 1/0212* (2013.01); *G05D 1/0295* (2013.01); *G08G 1/22* (2013.01)

(58) Field of Classification Search
CPC .. G05D 1/0297; G05D 1/0293; G05D 1/0287; G05D 1/0212; G05D 1/0295; G05D 2201/0213; G08G 1/22
See application file for complete search history.

(56) References Cited

U.S. PATENT DOCUMENTS

2017/0344023 A1* 11/2017 Laubinger ........... B60W 30/165
2018/0188746 A1* 7/2018 Lesher ................ G05D 1/0217
(Continued)

FOREIGN PATENT DOCUMENTS

WO WO-2013165297 A1 * 11/2013 ........... G05D 1/0293
WO WO-2018035145 A1 * 2/2018 .......... B60W 30/165
WO WO-2019117795 A1 * 6/2019 ............ B60W 30/10

*Primary Examiner* — Anne Marie Antonucci
*Assistant Examiner* — Jared C Bean
(74) *Attorney, Agent, or Firm* — SLATER MATSIL, LLP

(57) ABSTRACT

A method of performing autonomous driving based on platooning by a moving object includes setting a moving path, determining whether platooning is allowed, transmitting moving path information to a first intelligent transportation system infrastructure when the moving object of a plurality of moving objects approaches a preset range of the first intelligent transportation system infrastructure, receiving platooning information from the first intelligent transportation system infrastructure, and performing platooning based on the platooning information, wherein the first intelligent transportation system infrastructure groups ones of the moving objects capable of platooning from among the plurality of moving objects based on the moving path information received from each of the plurality of moving objects.

17 Claims, 17 Drawing Sheets

(56) References Cited

U.S. PATENT DOCUMENTS

| | | | |
|---|---|---|---|
| 2019/0079659 A1* | 3/2019 | Adenwala | H04W 4/46 |
| 2020/0033887 A1* | 1/2020 | Kim | H04W 12/10 |
| 2020/0090521 A1* | 3/2020 | Kim | G08G 1/163 |
| 2020/0150684 A1* | 5/2020 | Kim | G08G 1/0145 |

* cited by examiner

COMMUNICABLE RANGE (BASE STATION CONTROL MODE)

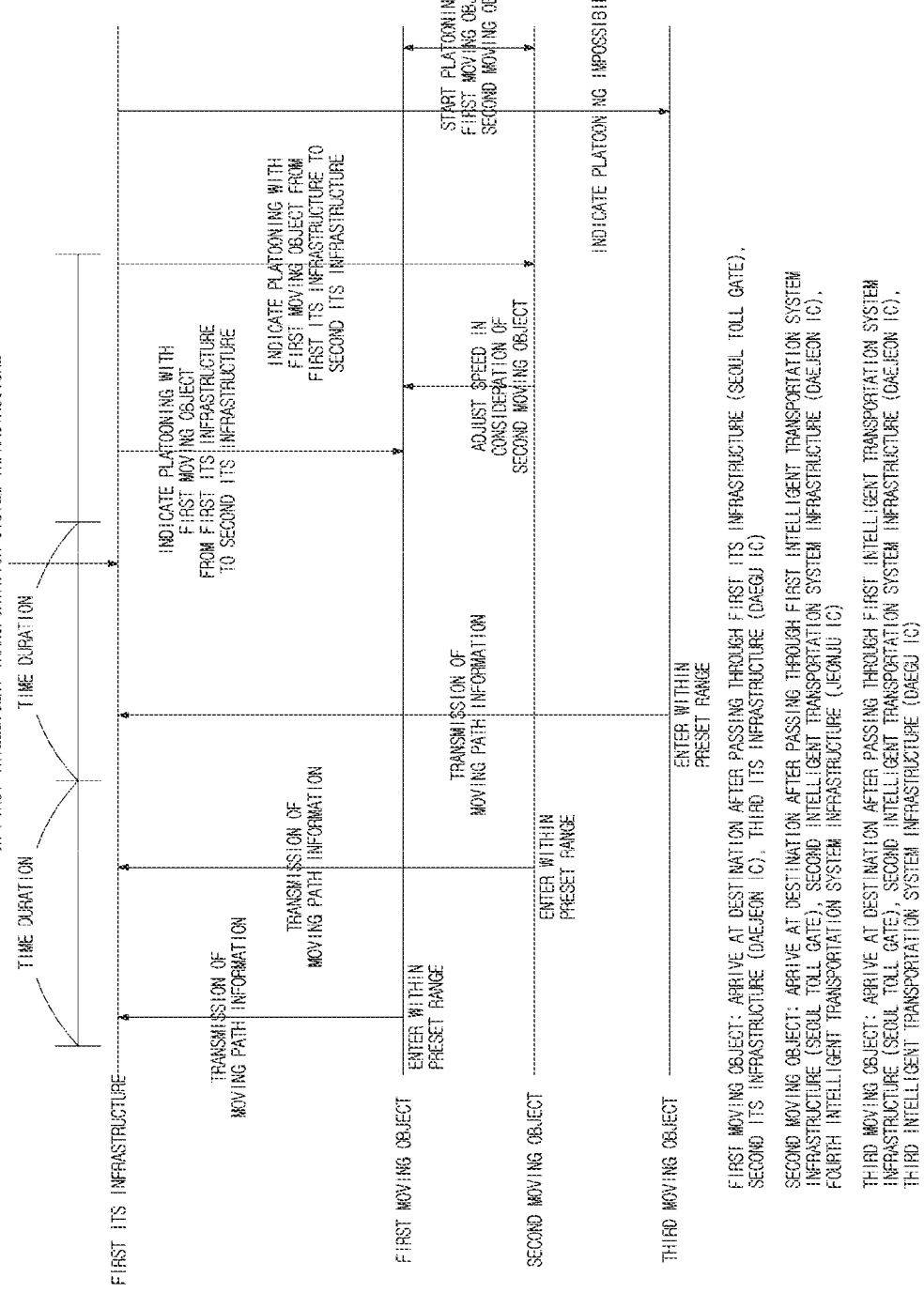

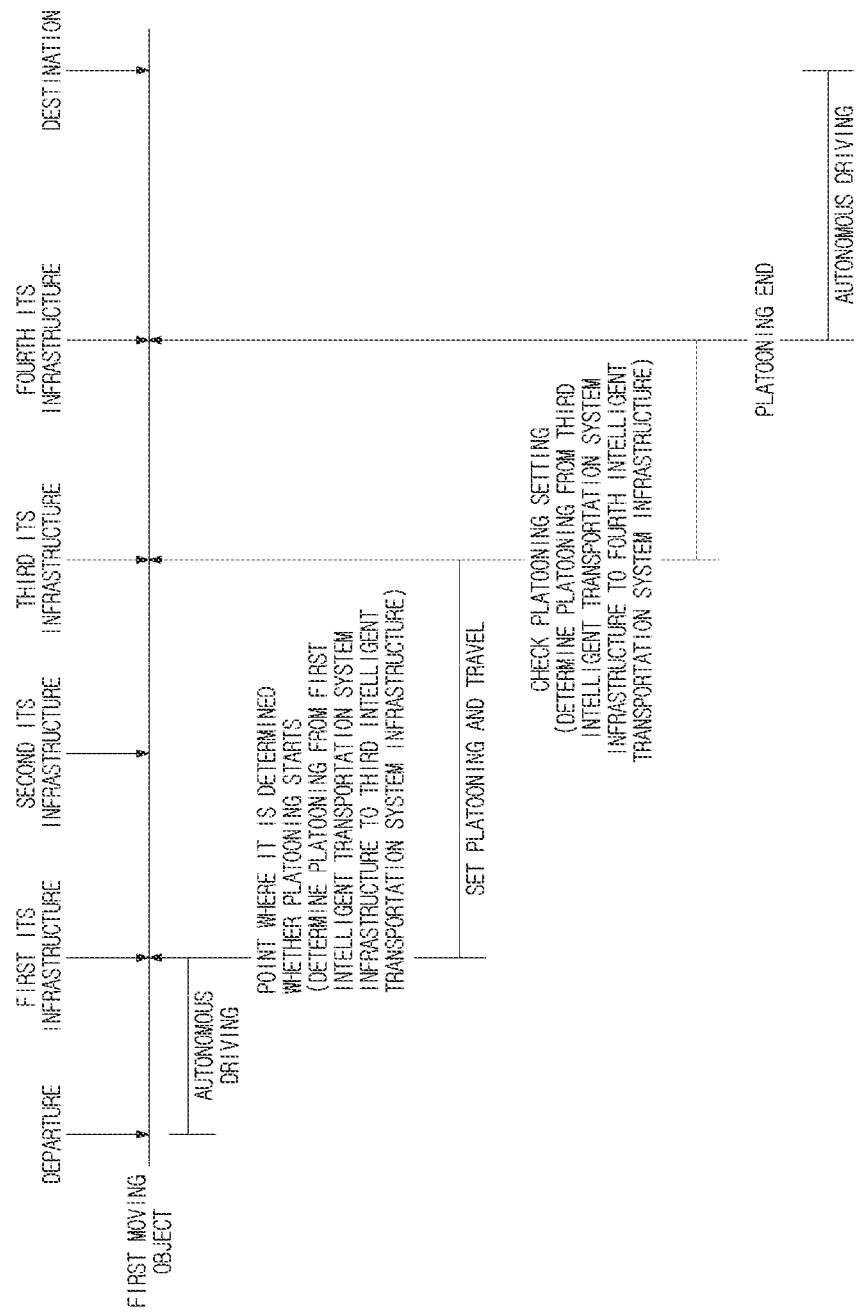

METHOD AND APPARATUS FOR PERFORMING PLATOONING OF THE MOVING OBJECT

CROSS-REFERENCE TO RELATED APPLICATIONS

This application claims the benefit of Korean Patent Application No. 10-2020-0011140, filed on Jan. 30, 2020, which application is hereby incorporated herein by reference.

TECHNICAL FIELD

The present invention relates to a method and apparatus for performing platooning of a moving object.

BACKGROUND

With technology development, a vehicle may perform communication with other devices based on various types of communication methods. In addition, in addition to vehicles, various devices may be used as a moving object and methods of performing communication through such devices are being developed.

An autonomous vehicle refers to a human-friendly vehicle which can automatically recognize, determine and control a driving environment using information collected through sensors and a vehicle-to-everything (V2X) communication device installed therein without a driver's direct manipulation. According to the standards proposed by the Society of Automotive Engineers (SAE), the autonomous vehicle is defined in a total of six steps, and Level 3 (conditional automation), Level 4 (high automation) and Level 5 (full automation) may correspond to full-scale autonomous driving.

SUMMARY

The present invention relates to a method and apparatus for performing platooning of a moving object. Particular embodiments relate to a method and apparatus for performing platooning of the moving object based on an intelligent transportation system infrastructure.

Platooning may be required for efficient driving of the autonomous vehicle. For example, platooning may mean that several autonomous vehicles follow a leading vehicle at narrow intervals. A method of using an intelligent transportation system infrastructure for platooning will be described.

An embodiment of the present invention provides a method and apparatus for performing platooning of a moving object.

Another embodiment of the present invention provides a method and apparatus for performing platooning of the moving object based on an intelligent transportation system infrastructure.

Another embodiment of the present invention provides a method and apparatus for performing platooning of the moving object through autonomous driving based on an intelligent transportation system infrastructure.

According to an embodiment of the present disclosure, a method of performing autonomous driving based on platooning is provided. The method of performing autonomous driving based on platooning by a moving object may include the moving object setting, by the moving object, a moving path, determining, by the moving object, whether platooning is allowed, transmitting, by the moving object, moving path information to a first intelligent transportation system infrastructure when the moving object approaches a preset range of the first intelligent transportation system infrastructure, receiving platooning information from the first intelligent transportation system infrastructure, and performing platooning based on the platooning information. The first intelligent transportation system infrastructure may receive moving path information from a plurality of moving objects passing through the first intelligent transportation system infrastructure and group moving objects capable of platooning among a plurality of moving objects based on moving path information received from the plurality of moving objects.

According to another embodiment of the present disclosure, a moving object for performing autonomous driving based on platooning is provided. The moving object includes a transceiver configured to transmit and receive a signal, and a processor configured to control the transceiver. The processor may be configured to set a moving path, determine whether platooning of the moving object is allowed, transmit moving path information to a first intelligent transportation system infrastructure when the moving object approaches a preset range of the first intelligent transportation system infrastructure, receive platooning information from the first intelligent transportation system infrastructure, and perform platooning based on the platooning information. The first intelligent transportation system infrastructure may receive moving path information from a plurality of moving objects passing through the first intelligent transportation system infrastructure and group moving objects capable of platooning among a plurality of moving objects based on the moving path information received from the plurality of moving objects.

According to another embodiment of the present disclosure, a method of performing autonomous driving based on platooning is provided. The method of controlling a moving object for performing autonomous driving by an intelligent transportation system infrastructure based on platooning includes receiving, by an intelligent transportation system infrastructure, moving path information from a plurality of moving objects approaching within a preset range, checking, by the intelligent transportation system infrastructure, a group of moving objects capable of platooning based on the received moving path information, and transmitting platooning information of the group of the moving objects capable of platooning. The moving objects capable of platooning may travel based on platooning information of the intelligent transportation system infrastructure.

According to another embodiment of the present disclosure, an intelligent transportation system infrastructure for controlling a moving object for performing autonomous driving based on platooning is provided. The intelligent transportation system infrastructure controlling the moving object for performing autonomous driving based on platooning includes a transceiver configured to transmit and receive a signal and a processor configured to control the transceiver. The processor may receive moving path information from a plurality of moving objects approaching within a preset range, check a group of moving objects capable of platooning based on the received moving path information of the moving objects, and transmit platooning information of the group of the moving objects capable of platooning. The moving objects capable of platooning may travel based on platooning information of the intelligent transportation system infrastructure.

The technical problems that may be solved by embodiments of the present invention are not limited to the above technical problems and other technical problems which are not described herein will become apparent to those skilled in the art from the following description.

BRIEF DESCRIPTION OF THE DRAWINGS

The above and other objects, features and other advantages of embodiments of the present invention will be more clearly understood from the following detailed description taken in conjunction with the accompanying drawings, in which:

FIG. 11 is a view showing a detailed operation of a moving object for performing platooning, according to an embodiment of the present invention;

FIG. 12 is a view showing a detailed operation of a moving object for performing platooning, according to an embodiment of the present invention;

DETAILED DESCRIPTION OF ILLUSTRATIVE EMBODIMENTS

Figure 1:
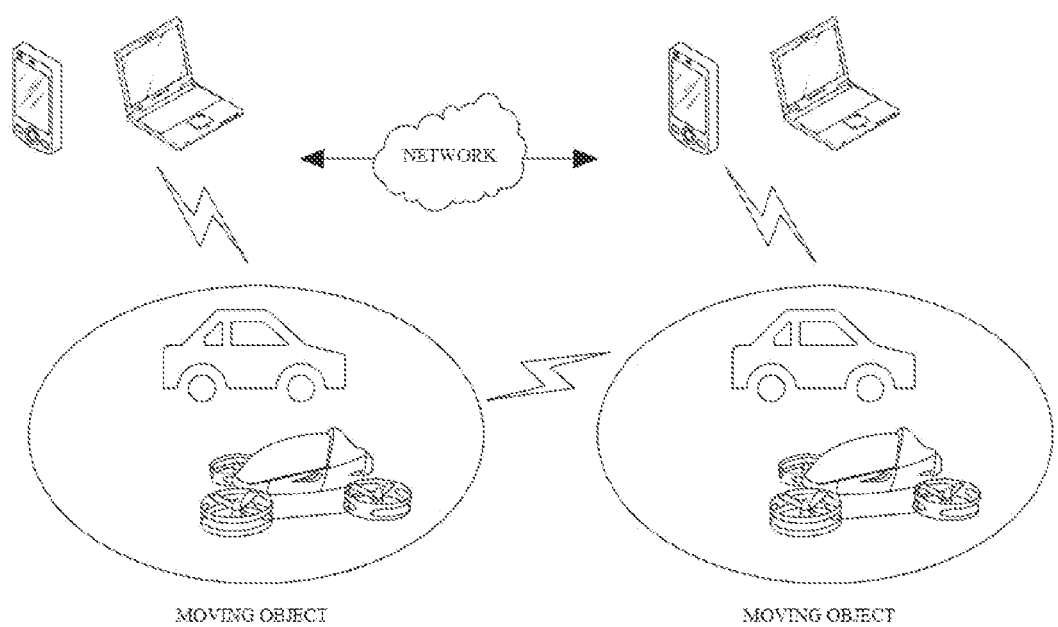
FIG. 1 is a view illustrating a method of, by a moving object, performing communication with another moving object or a device via a network, according to an embodiment of the present invention.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "connected" or "coupled" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other elements in addition to the elements described in the various embodiments are also included in the scope of the present disclosure.

Methods of accomplishing the advantages and features of the present disclosure will be apparent in reference to the embodiments that are described below in detail in conjunction with the accompanying drawings. However, the present disclosure is not limited to the embodiments set forth herein but may be embodied in many different forms. The present embodiments are provided to make disclosed contents of the present disclosure thorough and complete and to completely convey the scope of the disclosure to those with ordinary skill in the art.

FIG. 1 is a view illustrating a method where a moving object communicates with another moving object or device through a network. Referring to FIG. 1, a moving object may communicate with another moving object or another device. Herein, for example, a moving object may communicate with another moving object or another device based on cellular communication, WAVE communication, DSRC (Dedicated Short Range Communication) and other communication systems. In other words, a cellular network like LTE and 5G, a WiFi network and a WAVE network may be used. In addition, a short-range network like DSRC for moving objects may be used. The above-described embodiments are not exhaustive.

In addition, for example, with regard to communication of a moving object, for the security of a moving object, a communication module dedicated for devices inside the moving object may be separated from a module for communicating with a device outside the moving object. For example, only devices within a certain range inside a moving object may perform communication such as WiFi communication based on security. For example, a communication module may be included for communication between a moving object and the driver's personal device. In other words, a moving object and the driver's personal device may use a communication network blocked from an external communication network. In addition, for example, a moving object may include a communication module performing communication with an external device. In addition, for example, the above-described module may be implemented as a single module. In other words, based on a single module, a moving object may communicate with anther device, which is not limited to the above-described embodiment. In other words, communication in a moving object may be embodied in various methods and is not limited to the above-described embodiment.

Herein, for example, a moving object may refer to a device. For example, a moving object may be a vehicle (including an autonomous vehicle or an automated vehicle), a drone, a mobility, a mobile office, a mobile hotel, a PAV (Personal Air Vehicle), UAM (Urban Air Mobility), or eVTOL (Electric Vertical Take-Off and Landing). In addition, a moving object may be any other mobile device and is not limited to the above-described embodiments.

In addition, for example, platooning may mean that a plurality of moving objects are grouped over a network and driven based on a leading moving object. For example, when platooning is performed, moving objects are grouped and a leading moving object in the group may become a leader moving object. At this time, the moving objects in the group may perform communication with the leading moving object and are autonomously driven based on information received from the leading moving object without control of a driver. At this time, for example, an energy reduction effect of a moving object based on platooning may be expected. That is, the energy of the moving object may be reduced by not performing unnecessary operations based on the driving information of the leading moving object. In addition, for example, traffic efficiency may increase based on platooning, and it may be helpful to manage a path (e.g., road, route, etc.), on which the moving object is moved. At this time, for example, currently, platooning is performed based on the leading moving object through vehicle-to-vehicle communication, but there is a need to utilize an intelligent transportation system infrastructure in order to increase platooning efficiency. At this time, for example, the intelligent transportation system infrastructure may include at least one of at least one traffic facility device installed on a path (e.g., a road, a route, etc.) on which moving objects travel or an intelligent transport system (ITS) server device connected to the at least one traffic facility device via a network to transmit and receive data. For example, when the path on which the moving object travels is a road, the traffic facility device may include a road side unit (RSU). In addition, the traffic facility device may be installed on the road and may independently serve as a server. In addition, as another example, the ITS server device may collect information or data provided by the at least one traffic facility device to configure or provide intelligent transportation information or set environment settings for platooning or determining a group of moving objects for performing platooning to provide the same to the at least one traffic facility device or the moving object. In addition, the environment of the road on which moving objects move may include toll gates of highways, entrances to service areas, entrances to rest areas, etc., and various types of intelligent transportation system infrastructures may be installed according to the road environments. In addition, the intelligent transportation system infrastructure may basically perform communication with moving objects moving on the road. Further, the intelligent transportation system infrastructure may be other devices installed on the road, is not limited to the above-described embodiments and may be variously changed. Hereinafter, a method of performing platooning based on the intelligent transportation system infrastructure will be described. Although the path on which the moving object travels is a road in the embodiment of the present disclosure, the present disclosure is not limited thereto and the path on which the moving object travels may be variously changed according to the shape of the moving object. Further, the traffic facility device or the ITS server device may also be variously changed.

Figure 2:
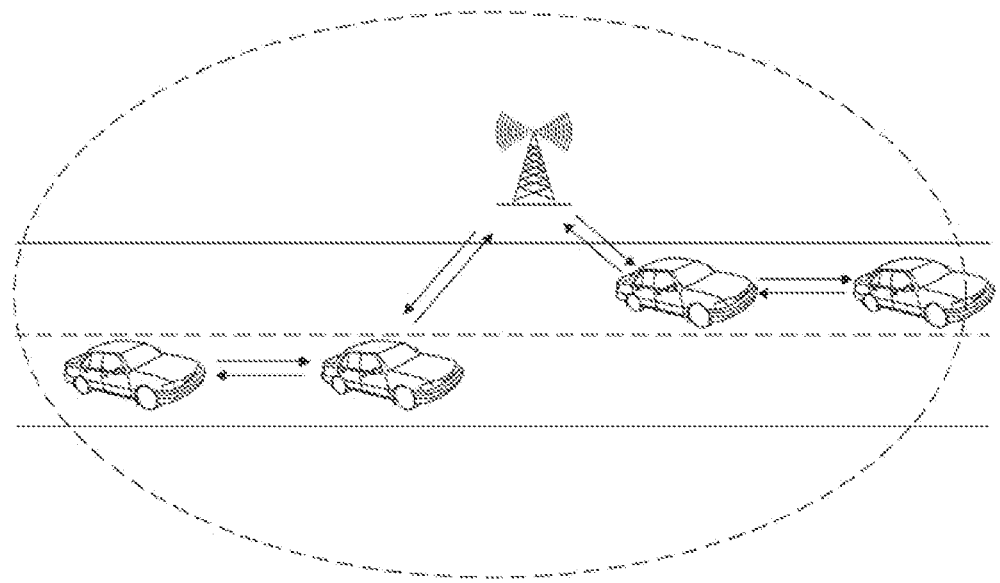
FIG. 2 is a view showing an example of a method of performing communication by a moving object, according to an embodiment of the present invention.

FIG. 2 is a view showing an example of a method of performing communication by a moving object, according to an embodiment of the present invention.

Referring to FIG. 2, a moving object may perform communication with another moving object or another device. At this time, for example, the moving object may perform communication with another moving object under control of a base station. For example, the moving object may be allocated a resource for performing communication with another moving object from the base station, and perform communication with another moving object based on the allocated resource. That is, communication of the moving object may be controlled by the base station, thereby securing reliability.

As another example, the moving object may transmit data to the base station and transmit data transmitted by the base station to another moving object. That is, the moving object may directly perform communication with another moving object under control of the base station or may perform communication via the base station, without being limited to the above-described embodiment.

Figure 3:
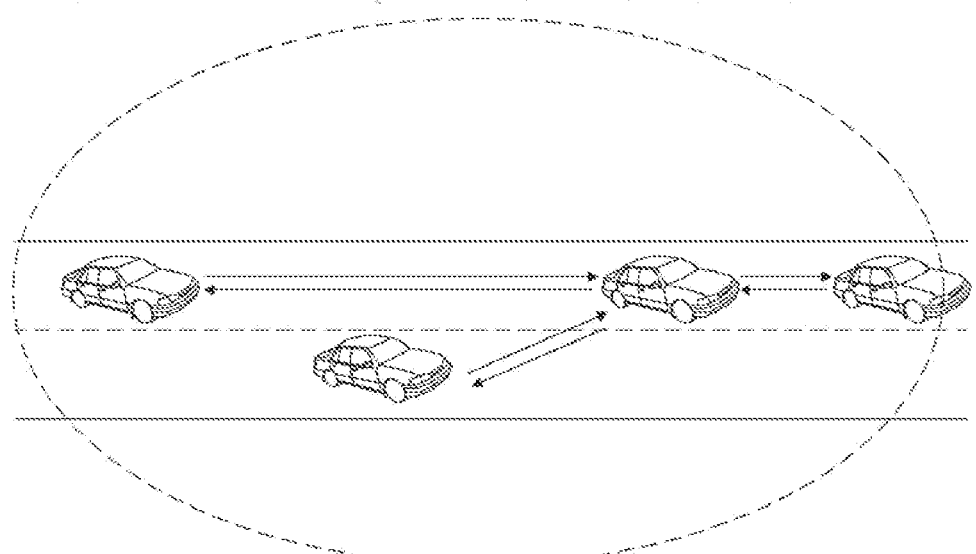
FIG. 3 is a view showing another example of a method of performing communication by a moving object, according to an embodiment of the present invention.

FIG. 3 is a view showing another example of a method of performing communication by a moving object, according to an embodiment of the present invention. Referring to FIG. 3, the moving object may perform communication with another moving object. At this time, for example, the moving object may perform data exchange through direct communication with another moving object. That is, the moving object and another moving object may perform direct communication without control of the base station or another control device. For example, when the moving object performs communication with another moving object, a resource for communication may be directly determined and data exchange with another moving object may be performed based on the determined resource. In addition, for example, the moving object may directly determine setting information for performing communication with another moving object and transmit the determined information to another moving object to perform communication. Therefore, the moving object may perform communication with another moving object, without being limited to the above-described embodiment.

In addition, for example, the moving object may perform communication with another moving object based on moving object methods, without being limited to the above-described embodiment.

Figure 4:
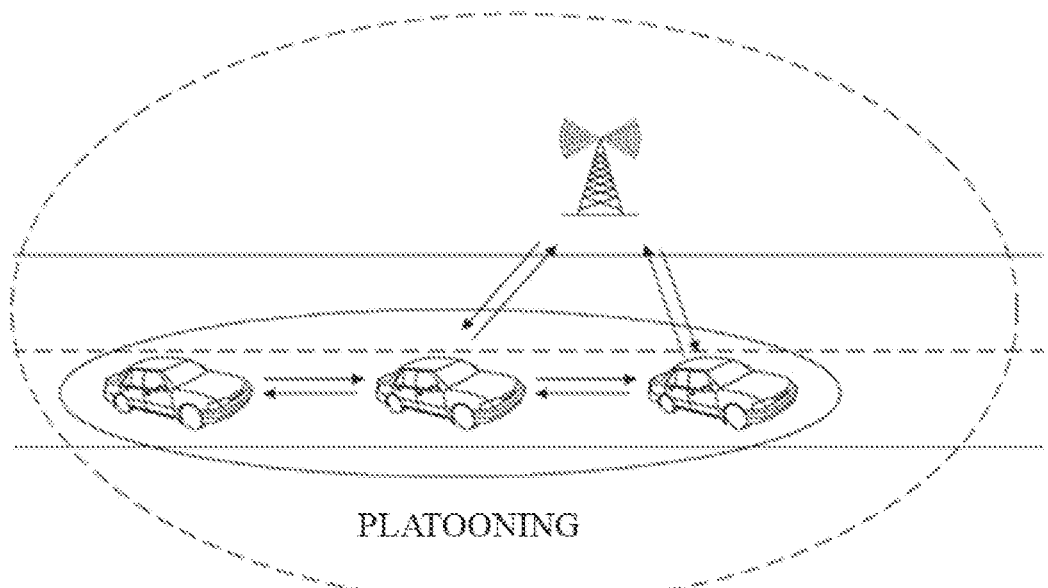
FIG. 4 is a view illustrating a method of performing platooning of the moving object, according to an embodiment of the present invention.

FIG. 4 is a view illustrating a method of performing platooning of the moving object, according to an embodiment of the present invention. Referring to FIG. 4, the moving object may perform platooning as described above. At this time, for example, moving objects for performing platooning may perform mutual identification using a group identifier. At this time, for example, terminals in a group for platooning may exchange data through mutual communication and perform platooning based on the exchanged data. As another example, when platooning is performed, a leader moving object may be determined in the group for platooning. When the leader moving object is determined, other moving objects in the group may be controlled through the leader moving object. For example, the other moving objects in the group may perform communication with only the leader moving object. When a group is formed, platooning may be controlled through the leader moving object. Meanwhile, for example, even in the case of platooning, as described above, the moving objects may perform communication under control of the base station. In addition, for example, the moving objects for performing platooning may exchange messages with each other through direct communication without control of the base station and perform platooning, without being limited to the above-described embodiment.

Figure 5:
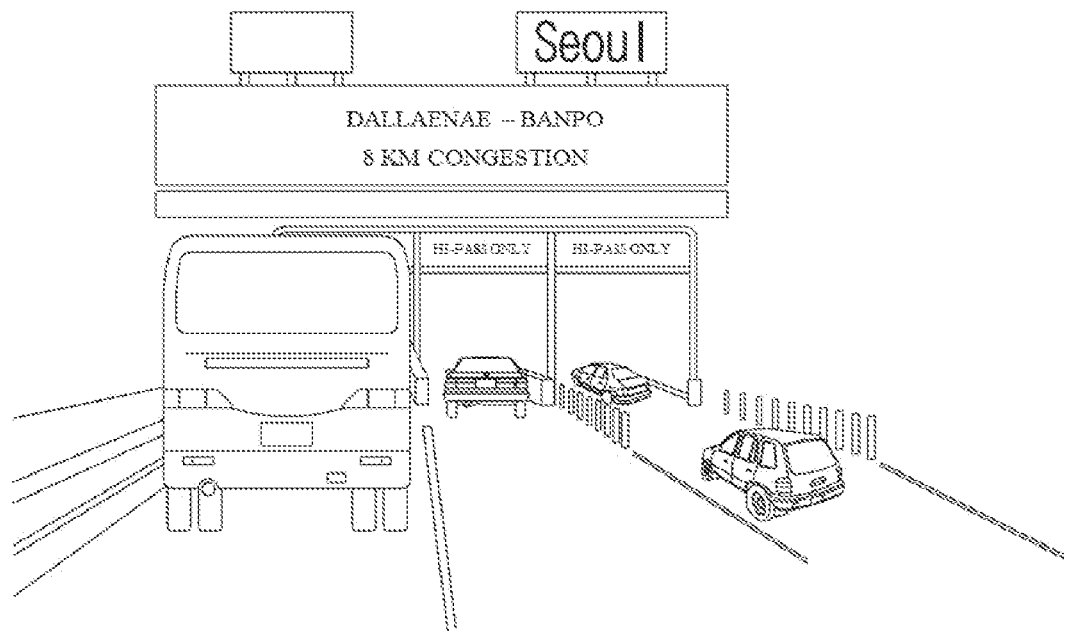
FIG. 5 is a view illustrating a method of performing platooning of the moving object, according to an embodiment of the present invention.

FIG. 5 is a view illustrating a method of performing platooning of the moving object, according to an embodiment of the present invention.

As described above, when platooning is performed, the moving objects need to perform communication with the leader moving object. In addition, the leader moving object needs to check whether each moving object is continuously included in the group. In addition, for example, in the case of platooning, when forming a group for platooning, a starting point, a platooning end time and a platooning end point need to be determined. At this time, in consideration of the above-described points, it may be difficult to set platooning at an arbitrary time in time and it may be necessary to set a starting point and an end point in advance. However, for example, when a traffic situation and platooning of a plurality of moving objects are considered, there may be limitations in the above-described operation. Accordingly, in consideration of the above-described points, platooning needs to be performed in connection with the intelligent transportation system infrastructure. For example, platooning is applicable to a road on which moving objects may travel at a certain speed or more, such as a highway. In addition, for example, the intelligent transportation system infrastructure may be implemented through the RSU or the other devices as described above, without being limited to the above-described embodiments.

As a more specific example, referring to FIG. 5, moving objects may pass through a toll gate to enter a highway. At this time, for example, currently, the toll gate may include a hi-pass system and a system for checking the path of the moving object. In consideration of the above-described points, the intelligent transportation system infrastructure may be installed in the toll gate. For example, the intelligent transportation system infrastructure may be connected with the hi-pass system and used for platooning of the moving object. In addition, for example, the intelligent transportation system infrastructure may be implemented based on road signs or other structures, without being limited to the above-described embodiment. In addition, for convenience of description, a method of controlling platooning based on the intelligent transportation system infrastructure will be described. However, for example, the intelligent transportation system infrastructure may be various types of structures or RSUs, and is not limited to the below-described embodiments. However, for convenience of description, hereinafter, a method of performing platooning based on the intelligent transportation system infrastructure will be described.

Figure 6:
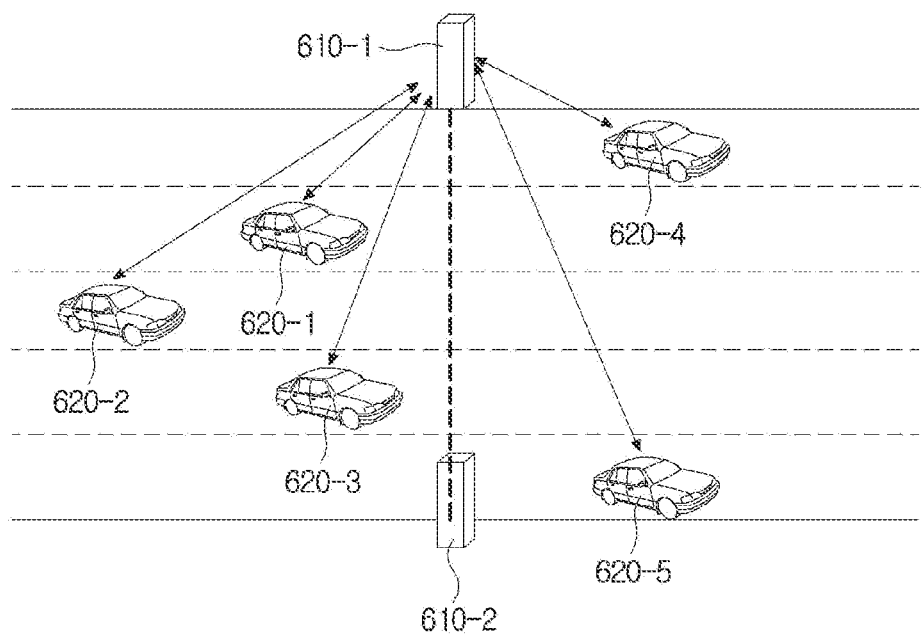
FIG. 6 is a view illustrating a method of performing platooning of the moving object based on an intelligent transportation system infrastructure, according to an embodiment of the present invention.

FIG. 6 is a view illustrating a method of performing platooning of the moving object based on an intelligent transportation system infrastructure, according to an embodiment of the present invention.

For example, the intelligent transportation system infrastructure may include a system for platooning. For example, the system for platooning may include a device for sensing the moving objects passing through the intelligent transportation system infrastructure. In addition, for example, in the system for platooning, information related to platooning, such as information on a list of moving objects capable of platooning, platooning status information, etc. may be stored. That is, a system for controlling platooning of the moving objects may be built in the intelligent transportation system infrastructure, without being limited to the above-described embodiment. In addition, for example, intelligent transportation system infrastructures in which the system for platooning is built may communicate with each other. For example, the intelligent transportation system infrastructures may be connected through a backhaul network. In addition, for example, the intelligent transportation system infrastructures may be controlled through a central server. In addition, for example, each intelligent transportation system infrastructure may operate as an independent server, without being limited to the above-described embodiment.

As a more specific example, referring to FIG. 6, intelligent transportation system infrastructures 610-1 and 610-2 may detect moving objects. For example, the intelligent transportation system infrastructures 610-1 and 610-2 may detect moving objects located at a preset distance. At this time, the preset distance may be differently set by a communication system, a sensor, etc., without being limited to the above-described embodiment. At this time, for example, the intelligent transportation system infrastructures 610-1 and 610-2 may perform communication with the detected moving objects 620-1, 620-2, 620-3, 62o-4 and 620-5. For example, the moving objects 620-1, 620-2, 620-3, 620-4 and 620-5 may transmit messages related to platooning to the intelligent transportation system infrastructures 610-1 and 610-2, which will be described below.

Figure 7:
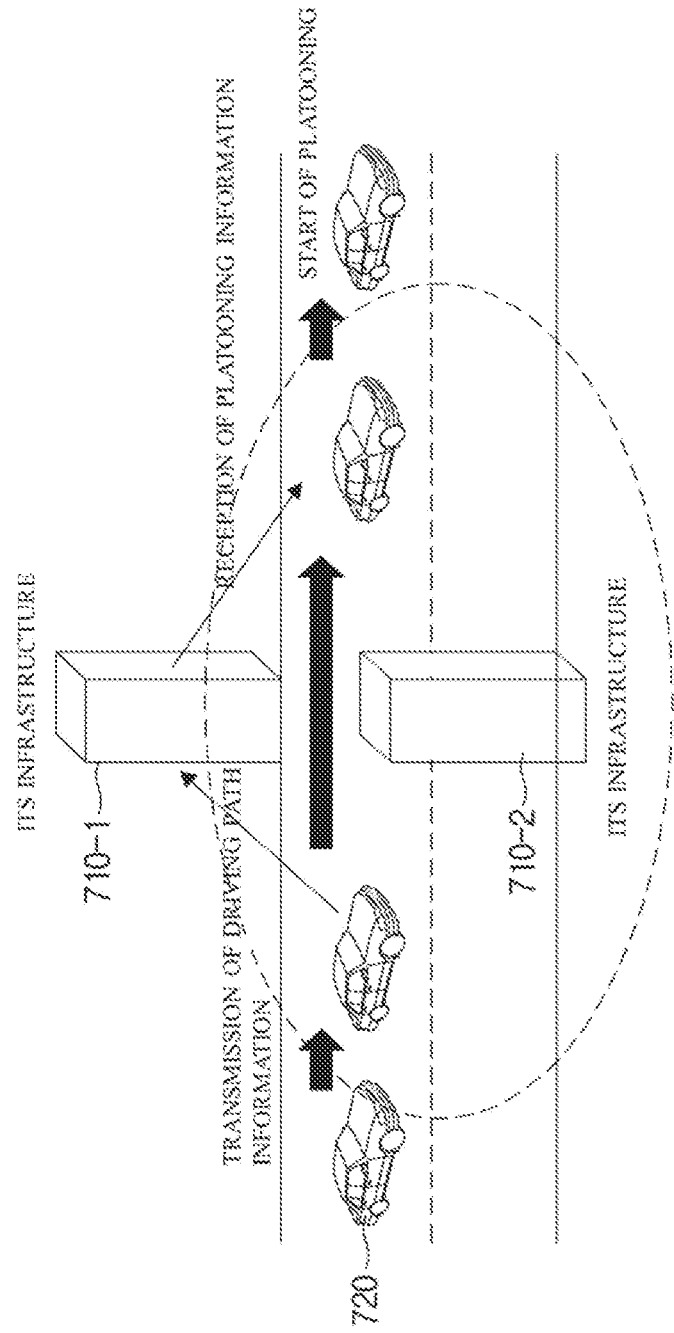
FIG. 7 is a view illustrating a method of performing platooning of the moving object based on an intelligent transportation system infrastructure, according to an embodiment of the present invention.

FIG. 7 is a view illustrating a method of performing platooning of the moving object based on an intelligent transportation system infrastructure, according to an embodiment of the present invention.

Referring to FIG. 7, intelligent transportation system (ITS) infrastructures 710-1 and 710-2 may detect moving objects located within a preset distance. That is, when a moving object moves to the preset distance or less from the intelligent transportation system infrastructures 710-1 and 710-2, the intelligent transportation system infrastructures 710-1 and 710-2 may detect the moving object. For example, the intelligent transportation system infrastructure may be one or a plurality of structures, without being limited to the above-described embodiment. However, for convenience of description, although the intelligent transportation system infrastructure is described as a structure installed based on a plurality of structures, the present disclosure is not limited thereto.

More specifically, when a moving object 720 enters the preset distance from the intelligent transportation system infrastructures 710-1 and 710-2, the intelligent transportation system infrastructures 710-1 and 710-2 may detect the moving object 720. Thereafter, the moving object 720 may transmit information related to platooning to the intelligent transportation system infrastructures 710-1 and 710-2. At this time, for example, information related to platooning may include information on whether platooning is allowed, information on the moving path of the moving object, the type identifier of the moving object indicating whether it is possible to lead platooning and other information related to platooning. At this time, for example, the intelligent transportation system infrastructures 710-1 and 710-2 may receive information related to platooning from a plurality of moving objects. At this time, for example, the intelligent transportation system infrastructures 710-1 and 710-2 may select a moving object capable of platooning based on information received from the plurality of moving objects. Further, the information related to platooning may further include satisfaction information of platooning, and the intelligent transportation system infrastructures 710-1 and 710-2 may select a moving object capable of platooning by further considering the satisfaction information of platooning. For example, after completing platooning, the moving object may provide an environment for enabling a user (e.g., a driver) to input whether or not platooning is satisfied and receive whether the user is satisfied with platooning whenever platooning is performed in such an environment. In addition, the moving object may configure satisfaction information of platooning by digitizing whether platooning is satisfied. At this time, satisfaction information of platooning may include moving objects for performing platooning and a leader moving object of platooning. Based on this, the intelligent transportation system infrastructures 710-1 and 710-2 may determine that the corresponding vehicle is capable of platooning when the satisfaction information of platooning has a level indicating satisfaction with platooning and determine that the corresponding moving object is incapable of platooning when the satisfaction information has a level indicating dissatisfaction with platooning.

For example, the intelligent transportation system infrastructures 710-1 and 710-2 may select a moving object capable of platooning based on a moving object having an overlapping driving path. In addition, for example, the intelligent transportation system infrastructures 710-1 and 710-2 may select a moving object capable of platooning based on a time when a message is received from the moving object. For example, the intelligent transportation system infrastructures 710-1 and 710-2 may determine whether platooning is possible with respect to only the moving object which has transmitted the message related to platooning within a preset time range or distance range. For example, the preset time range may be differently set based on the driving speed of the moving object or a traffic congestion degree. That is, there may be a time duration for determining whether platooning is possible. For example, the preset distance range may be variously set according to the type of the intelligent transportation system infrastructure based on the environment (e.g., toll gates, entrances to service areas, entrances to rest areas) in which the intelligent transportation system infrastructure is built.

Preferably, in one embodiment of the present disclosure, all moving objects may be configured to function as a leader in platooning, at least one moving object included in a platooning group may be set as a leader moving object based on a preset rule (e.g., the order of passing through the intelligent transportation system infrastructures 710-1 and 710-2), and the remaining moving objects except for the leader moving object may be set as following moving objects. As another example, the moving objects may include moving objects of a first type which may function as a leader and moving objects of a second type which may not function as a leader. The moving object may configure and provide moving object type information capable of identifying whether it is possible to lead platooning. In addition, the moving object may include moving object type information in the information related to platooning and the information to the intelligent transportation system infrastructure. In addition, the intelligent transportation system infrastructure may determine whether the moving object functions as a leader based on the moving object type information and determine at least one moving object among the moving objects capable of functioning as the leader (e.g., the moving objects of the first type) as the leader moving object. At this time, when there is a plurality of moving objects capable of functioning as the leader (e.g., the moving objects of the first type) in the platooning group, the intelligent transportation system infrastructure may determine the leader moving object based on the preset rule (e.g., the order of passing through the intelligent transportation system infrastructures 710-1 and 710-2). Meanwhile, when there is no moving object capable of functioning as the leader (e.g., moving object of the first type) in the platooning group, operation of forming the group of moving objects may be finished.

In addition, for example, the intelligent transportation system infrastructures 710-1 and 710-2 may determine whether platooning is possible in consideration of a traffic congestion degree. For example, platooning may be unnecessary when a traffic congestion degree indicates congestion. Therefore, the intelligent transportation system infrastructures 710-1 and 710-2 may check the traffic congestion degree and may not set a platooning group or release a preset platooning group when the traffic congestion degree exceeds a threshold indicating congestion. As another example, the intelligent transportation system infrastructures 710-1 and 710-2 may control the size of the platooning group, that is, the number of moving objects included in the platooning group, in consideration of the traffic congestion degree. For example, the intelligent transportation system infrastructures 710-1 and 710-2 may be set, such that the number of moving objects included in the platooning group is relatively large when the traffic congestion degree indicates a normal level and the number of moving objects included in the platooning group is relatively small when the traffic congestion degree indicates a delayed level.

In addition, for example, the intelligent transportation system infrastructures 710-1 and 710-2 may select a moving object which has first transmitted the message related to platooning as the leader moving object based on time setting. For example, the intelligent transportation system infrastructures 710-1 and 710-2 may include time setting information for generating a group for platooning. At this time, the intelligent transportation system infrastructures 710-1 and 710-2 may receive the message related to platooning from the moving object based on a specific point in time. At this time, the intelligent transportation system infrastructures 710-1 and 710-2 may perform platooning based on a moving object which has transmitted a message at a point in time closest to the specific point in time (that is, the foremost moving object at the specific point in time). The intelligent transportation system infrastructures 710-1 and 710-2 may receive the message related to platooning from other moving objects during a certain time after first receiving the message. At this time, the intelligent transportation system infrastructures 710-1 and 710-2 may select moving objects capable of platooning based on the received message and form a group. For example, when a group for platooning is formed, the intelligent transportation system infrastructures 710-1 and 710-2 may transmit platooning information to the moving objects in the group. At this time, the moving objects may check moving objects for performing platooning. Thereafter, the moving object may perform platooning with another moving object based on the travel path of the moving object. That is, in order to select a specific point and a specific time point for platooning, the intelligent transportation system infrastructures 710-1 and 710-2 may be used, thereby efficiently performing platooning. In one embodiment of the present disclosure, although the intelligent transportation system infrastructure collects information related to platooning via communication with the moving object and sets a platooning group based on this, the present disclosure is not limited thereto and may be variously changed. For example, the moving object may include an external display device and display a destination through the same (the external display). At this time, the external display device may include a display device provided in a window area provided in the moving object. In addition, the external display device may configure a portion of an external surface of the moving object or may be inserted into one area of an external surface of the moving object to output predetermined information. The intelligent transportation system infrastructure or the moving object may check the destination displayed through the external display device and set a platooning group using the checked destination. At this time, a destination recognition section in which the moving object travels at a predetermined speed or less or temporarily stops may be set, such that the intelligent transportation system infrastructure or the moving object more accurately checks the destination displayed through the external display device. Therefore, the intelligent transportation system infrastructure may be installed near the destination recognition section to detect the destination from the external display device of the moving object entering the destination recognition section. As another example, the moving object may check entry into the destination recognition section and detect the destination from the external display device of another moving object located ahead or behind.

Figure 8:
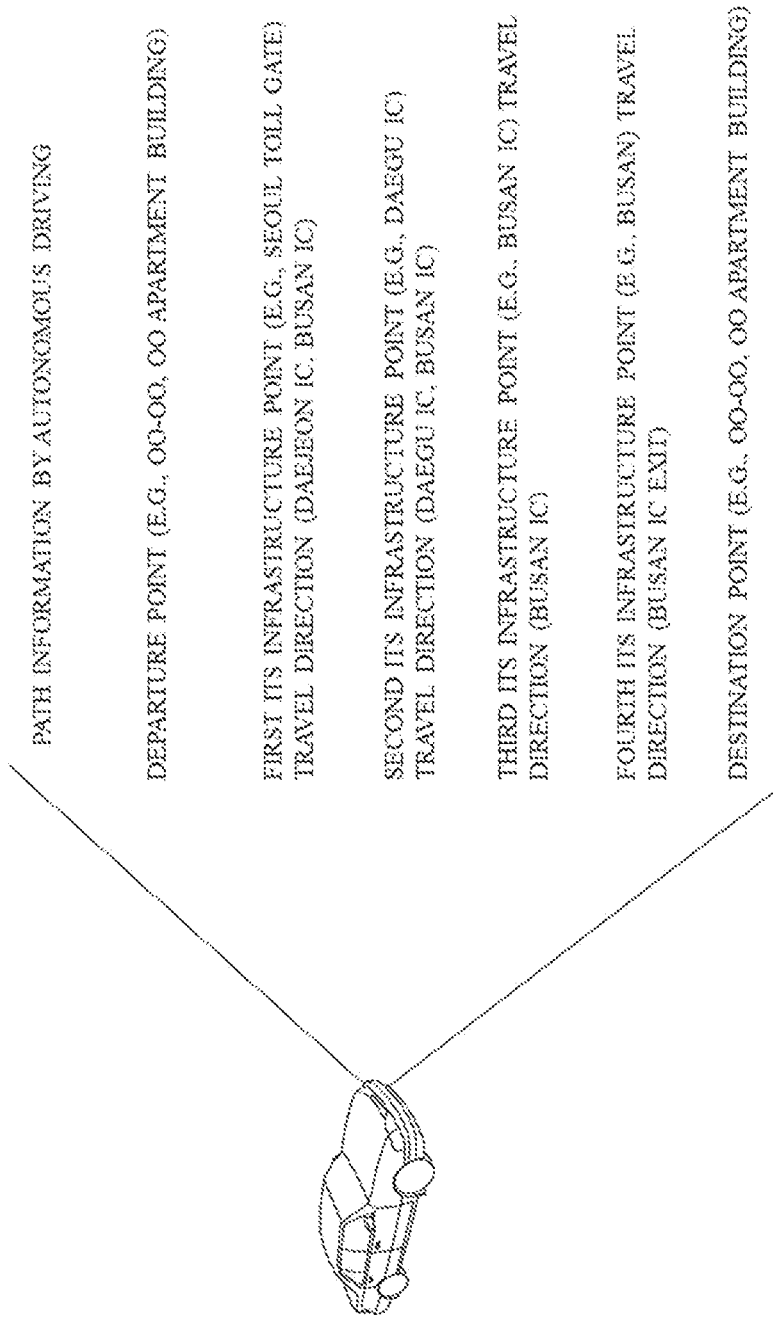
FIG. 8 is a view illustrating a path of a moving object for performing platooning, according to an embodiment of the present invention.

FIG. 8 is a view illustrating a path of a moving object for performing platooning, according to an embodiment of the present invention.

In the case of performing platooning based on the above description, the moving object is an autonomous vehicle in which platooning is allowed. At this time, for example, moving path information may be stored in the moving object, and, as described above, platooning may be performed based on the intelligent transportation system infrastructure. For example, referring to FIG. 8, the moving path information of the moving object may be set based on the intelligent transportation system infrastructure. For example, the moving path information may be set from an actual departure point to a specific destination (e.g., a specific apartment). However, for example, the moving path information may include not only information on the departure point and the destination but also information on an actual moving path. At this time, for example, in consideration of platooning, the moving path information may be set based on the intelligent transportation system infrastructure. For example, intelligent transportation system infrastructure information may be stored in the moving object, and the moving path information may be set based on the same. At this time, the intelligent transportation system infrastructure information may include an intelligent transportation system infrastructure identifier for identifying the intelligent transportation system infrastructure. For example, in FIG. 8, the moving object may travel to the destination through a first intelligent transportation system infrastructure, a second intelligent transportation system infrastructure, a third intelligent transportation system infrastructure and a fourth intelligent transportation system infrastructure. Meanwhile, for example, the moving object may transmit the moving path information including the information on the intelligent transportation system infrastructure to the intelligent transportation system infrastructure. As a more specific example, it is necessary to determine not only the starting point of the platooning path but also the end point. However, for example, when it is determined whether platooning ends based on the actual destination (e.g., a specific apartment), it may be difficult to find moving objects capable of platooning and platooning efficiency may decrease. However, since there may be a plurality of moving objects passing through a specific intelligent transportation system infrastructure (e.g. a toll gate), platooning may be performed based on the intelligent transportation system infrastructure, thereby increasing platooning efficiency. Accordingly, the moving object may transmit, to the intelligent transportation system infrastructure, the moving path information based on the intelligent transportation system infrastructure, thereby setting the path for platooning.

Further, in order to increase platooning efficiency, the intelligent transportation system infrastructure may set a platooning group in consideration of a distance from the starting point to the end point of the platooning path. For example, the intelligent transportation system infrastructure may set the platooning group with respect to moving objects whose distance from the starting point to the end point exceeds a predetermined threshold (e.g., 100 km, 150 km, 200 km, etc.).

As another example, the intelligent transportation system infrastructure may manage platooning management information including the start position and end position of the platooning group, the current position of a leader included in the group, and a residual distance (see Table 1). The intelligent transportation system infrastructure may determine that a new moving object 720' is approaching the intelligent transportation system infrastructure 720-3 and determine whether to add the new moving object 720' to a preset platooning group based on the platooning management information or check a group to be applied to a preset group.

TABLE 1

| <platooning management information> | | | | |
| --- | --- | --- | --- | --- |
| Traveling group | Start position | End position | Current position | Residual distance |
| Traveling group 1 | AAA IC | XXX IC | CCC IC | 200 km |
| Traveling group 2 | BBB IC | KKK IC | CCC IC | 100 km |
| Traveling group 3 | AAA IC | FFF IC | BBB IC | 50 km |
| . | . | . | . | . |
| . | . | . | . | . |
| . | . | . | . | . |

Although, in an embodiment of the present disclosure, the platooning group is set based on the moving path information of the moving object, such as a destination, a waypoint, etc. the present disclosure is not limited thereto and may be variously changed. For stable operation of platooning, it is necessary to consider the traveling characteristics (e.g., speed, acceleration performance on flatland, acceleration performance on slope, etc.) or braking characteristics (e.g., braking distance) of the moving object. Based on this, the intelligent transportation system infrastructure may set the platooning group in consideration of the size (e.g., length, width, etc.) of the moving object, the type of the moving object (e.g., Click®, Avante®, Sonata®, Grandeur®, Genesis®, Porter®, Starex®, Tucson®, Santa Fe®, Palisade®, Megatruck®, New Power Truck®, etc.), whether the moving object is loaded with cargo, the capacity of the cargo capable of being loaded in the moving object, and the actual weight of the cargo loaded in the moving object. For example, the intelligent transportation system infrastructure may basically set a preliminary platooning group based on the moving path information of the moving object, and finally set the platooning group in consideration of the size of the moving object, the type of the moving object, whether the moving object is loaded with cargo, the capacity of the cargo capable of being loaded in the moving object, the actual weight of the cargo loaded in the moving object, etc. Additionally, the intelligent transportation system infrastructure may check the autonomous driving level of the moving object and set moving objects having the same autonomous driving level as the same group.

Meanwhile, the moving object included in the platooning group may be moved to a service area, a rest area, etc. according to the request of the user (e.g., driver, passenger, etc.). The intelligent transportation system infrastructure provided in the entrance to the service area or the rest area may check moving objects entering the service area or the rest area and release platooning of the checked moving objects. For example, the intelligent transportation system infrastructure provided in the entrance to the service area or the rest area may determine whether the checked moving object is included in the platooning group and then exclude the moving object included in the platooning group from the corresponding platooning group. As another example, the vehicle may check a request for movement to the service area or the rest area from the user (e.g., driver, passenger, etc.), and request platooning release from the intelligent transportation system infrastructure. In addition, when the moving object re-enters the highway through an exit of the service area or the rest area, the intelligent transportation system infrastructure provided in the exit of the service area or the rest area may check the moving object re-entering the highway and reset platooning via communication with the moving object.

Figure 9A:
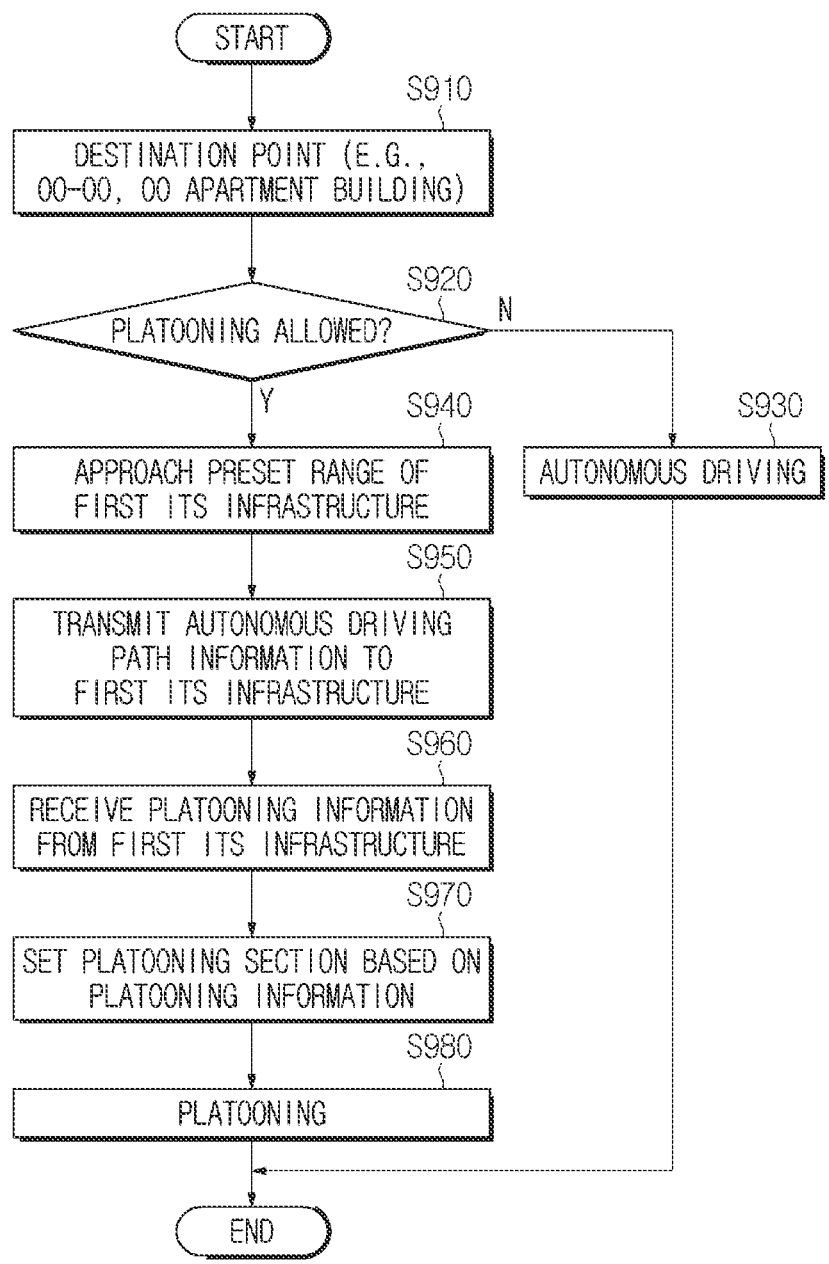
FIG. 9A is a flowchart illustrating operation of a moving object for performing platooning, according to an embodiment of the present invention.

FIG. 9A is a flowchart illustrating operation of a moving object for performing platooning, according to an embodiment of the present invention.

Referring to FIG. 9A, the moving object may determine autonomous driving and set a path (S910). At this time, the moving object may configure and store information on the set path, that is, the moving path information. In addition, for example, the moving path information configured by the moving object may include intelligent transportation system infrastructure information (e.g., intelligent transportation system infrastructure identifier). Next, the moving object may determine whether to allow platooning (S920). At this time, for example, whether to allow platooning may be determined by a driver who uses the moving object. In addition, for example, the determination may be made in the moving object system, without being limited to the above-described embodiment. At this time, when platooning is not allowed, the moving object may travel based on autonomous driving in an initially set state (S930). On the other hand, when platooning is allowed in the moving object, the moving object may perform platooning based on the intelligent transportation system infrastructure. At this time, for example, the moving object may travel based on existing autonomous driving until the first intelligent transportation system infrastructure of the set path. At this time, the moving object may approach a preset range of the first intelligent transportation system infrastructure (S940). At this time, the first intelligent transportation system infrastructure may detect the moving object, and the moving object may transmit the moving path information based on autonomous driving to the first intelligent transportation system infrastructure (S950). At this time, the first intelligent transportation system infrastructure may receive the moving path information from a plurality of moving objects within the preset time. Thereafter, the first intelligent transportation system infrastructure may set the group of the moving objects capable of platooning based on the received moving path information and transmit platooning related information to the moving object. That is, the moving object may receive platooning information from the first intelligent transportation system infrastructure (S960). Although, in an embodiment of the present disclosure, the first intelligent transportation system infrastructure exchanges messages with the moving object based on the preset time range and sets the groups of the moving objects capable of platooning, the present disclosure is not limited thereto and may be variously changed. For example, the moving objects may perform message exchange with the first intelligent transportation system infrastructure within a preset distance range and set the group of the moving objects capable of platooning based on the preset distance range. Specifically, the moving object may periodically provide position information to the first intelligent transportation system infrastructure within the preset distance range (e.g., 1 km) or provide position information at a predetermined section point, and the first intelligent transportation system infrastructure may set the group of the moving objects capable of platooning based on the provided position information.

Thereafter, the moving object may set a platooning section based on platooning information (S970). In addition, for example, the section in which the moving object performs platooning may be determined by the first intelligent transportation system infrastructure, and information thereon may be transmitted to the moving object, without being limited to the above-described embodiment. Thereafter, the moving object may form the group with the moving objects capable of platooning and perform platooning (S980).

Meanwhile, although, in step S960, the first intelligent transportation system infrastructure may determine the group of the moving objects capable of platooning and configure the platooning related information, the present disclosure is not limited thereto and may be variously changed. For example, the first to fourth intelligent transportation system infrastructures (or the server device connected to the first to fourth intelligent transportation system infrastructures) may be configured to share the moving path information received from the plurality of moving objects. In addition, the first to fourth intelligent transportation system infrastructures (or the server device connected to the first to fourth intelligent transportation system infrastructures) may set the group of the moving objects capable of platooning based on the shared moving path information of the moving object and configure platooning related information.

Figure 9B:
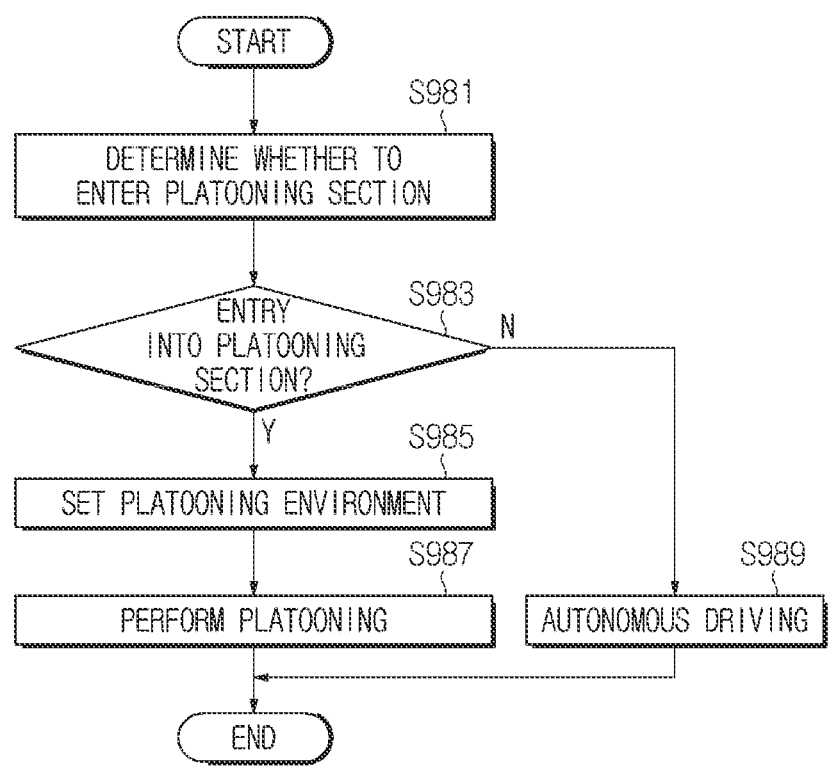
FIG. 9B is a flowchart illustrating detailed operation of a step of performing platooning of FIG. 9A.

Further, platooning performed in step S980 of FIG. 9A may be illustrated as shown in FIG. 9B. First, the moving object may check platooning information and determine whether to enter a platooning section (S981). Thereafter, when entering the platooning section (S983-Y), the moving object may check the group of the moving objects capable of platooning and set a platooning environment through message exchange with the moving objects included in the group (S985). In addition, the moving object may perform platooning based on information provided by the leader of the set group (S987). In contrast, when the moving object does not reach the platooning section (S983-N), the moving object may perform autonomous driving until reaching the platooning section (S989). Steps S981 to S989 may be repeatedly performed until platooning is completed.

Figure 10A:
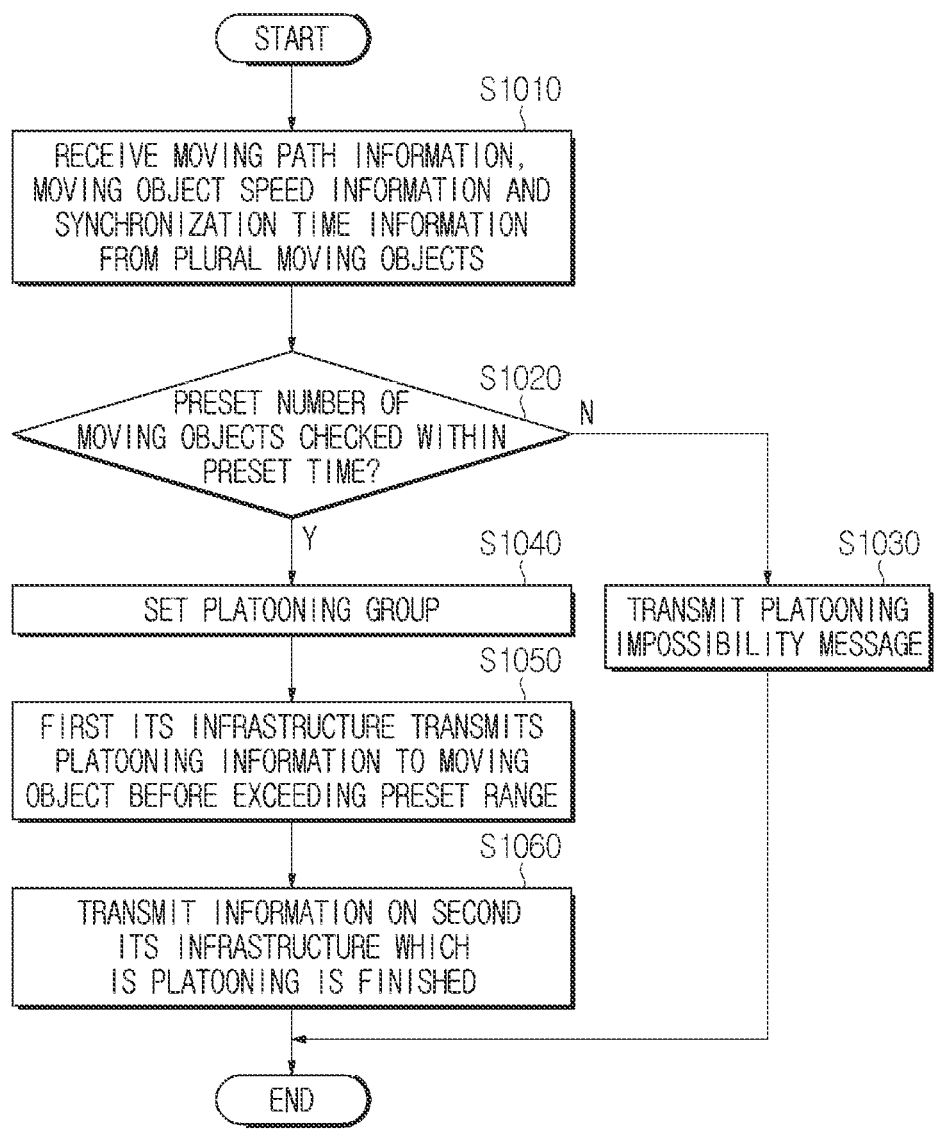
FIG. 10A is a flowchart illustrating operation of a moving object for performing platooning, according to an embodiment of the present invention.

FIG. 10A is a flowchart illustrating operation of a moving object for performing platooning, according to an embodiment of the present invention.

Referring to FIG. 10A, as described above, the first intelligent transportation system infrastructure may receive at least one of the moving path information and speed information or synchronization time information of the moving object from a plurality of moving objects (S1010). At this time, for example, the moving path information may be received based on the first intelligent transportation system infrastructure as described above. In addition, the speed information and the synchronization time information of the moving object may be further required to identify the group performing platooning. At this time, the moving object speed information may be speed information of the moving object after entering the preset range of the first intelligent transportation system infrastructure. In addition, for example, the synchronization time information of the moving object may be synchronization information necessary for communication when the moving object uses communication to transmit a message to the first intelligent transportation system infrastructure. Therefore, the first intelligent transportation system infrastructure may check information on the moving objects passing through the first intelligent transportation system infrastructure and, based on this, set a group for platooning. At this time, the first intelligent transportation system infrastructure may check moving objects capable of platooning (S1020). At this time, for example, the moving objects capable of platooning may be identified as a preset number of moving objects within a preset time. More specifically, when waiting for group setting for platooning in consideration of the speed information of the moving object, the moving object may already enter a range in which communication with the first intelligent transportation system infrastructure is impossible. In addition, for example, the moving object decreasing the speed to receive the message from the first intelligent transportation system infrastructure may affect traveling on the road. Accordingly, the first intelligent transportation system infrastructure may check the moving objects capable of platooning based on the preset time range. Although, in an embodiment of the present disclosure, the first intelligent transportation system infrastructure exchanges the message with the moving object based on the preset time range and sets the group of the moving objects capable of platooning, the present disclosure is not limited thereto and may be variously changed. For example, the first intelligent transportation system infrastructure may perform message exchange with the moving object within the preset distance range and set the group of the moving objects capable of platooning based on the preset distance range. To this end, the first intelligent transportation system infrastructure may check the position information of the moving object within the preset distance range (e.g., 1 km) in a time period unit or a preset distance unit, and the first intelligent transportation system infrastructure may set the group of the moving objects capable of platooning based on the same (position information).

In addition, for example, the number of moving objects included in the group of the moving objects capable of platooning may be limited. For example, the number of moving objects capable of platooning may be set to two or more and five or less. For example, when the number of moving objects capable of platooning increases, it may be difficult to form the group, which may affect the traffic condition. In consideration of the above-described point, the first intelligent transportation system infrastructure may limit the number of moving objects capable of platooning. That is, the intelligent transportation system infrastructure may select the moving object based on the preset number within the preset time and determine whether platooning is possible based on the same. Meanwhile, the first intelligent transportation system infrastructure may determine that platooning is impossible when the number of moving objects having the same path is insufficient or when a moving object is not detected within the preset time. At this time, the first intelligent transportation system infrastructure may transmit a platooning impossibility message to the moving object (S1030). At this time, for example, the moving object may travel based on existing autonomous driving, and may travel through autonomous driving without platooning until the second intelligent transportation system infrastructure after passing through the first intelligent transportation system infrastructure. Thereafter, the moving object may determine whether platooning is possible in the second intelligent transportation system infrastructure again, and form a group to perform platooning when platooning is possible. Although the first intelligent transportation system infrastructure determines the group of the moving objects capable of platooning and configures platooning related information, the present disclosure is not limited thereto and may be variously changed. For example, the first to fourth intelligent transportation system infrastructures (or the server device connected to the first to fourth intelligent transportation system infrastructures) may be configured to share the moving path information received from the plurality of moving objects. In addition, the first to fourth intelligent transportation system infrastructures (or the server device connected to the first to fourth intelligent transportation system infrastructures) may set the group of the moving objects capable of platooning based on the shared moving path information of the moving object and configure platooning related information.

Meanwhile, for example, when the moving object capable of platooning is identified, the first intelligent transportation system infrastructure may set a platooning group including the moving object (S1040). Operation of setting the platooning group by the first intelligent transportation system infrastructure will be described in detail with reference to FIG. 10B.

Thereafter, the first intelligent transportation system infrastructure may transmit platooning information to the moving object before exceeding the preset range (S1050). At this time, for example, moving objects which have received platooning information may identify the moving object performing platooning. At this time, the moving objects in the group may perform communication with each other and perform platooning. For example, when the group is set, the moving object may select a leader moving object under a certain condition and the selected leader moving object may travel at the head of the group. As another example, the first intelligent transportation system infrastructure may select the leader moving object (e.g., the leading moving object) of the group and transmit information thereon to the other moving objects in the group. At this time, the leader moving object may transmit platooning related information to the other moving objects in the group based on the information received from the first intelligent transportation system infrastructure, and perform platooning based on the transmitted information. That is, the leader moving object may be selected based on the first intelligent transportation system infrastructure, and the group for platooning may be controlled based on the selected leader moving object. In addition, for example, the first intelligent transportation system infrastructure may transmit information on the second intelligent transportation system infrastructure in which platooning is finished to the moving object performing platooning along with information indicating that platooning starts at a current point in time (S1060). At this time, for example, the second intelligent transportation system infrastructure in which platooning is finished may be selected based on the moving path information of the moving objects. For example, a longest common section among the moving path information of the moving objects may be selected as a path for platooning. At this time, the moving objects in the group for platooning may perform platooning until the second intelligent transportation system infrastructure, and, after that, arrive at the destination based on autonomous driving.

Figure 10B:
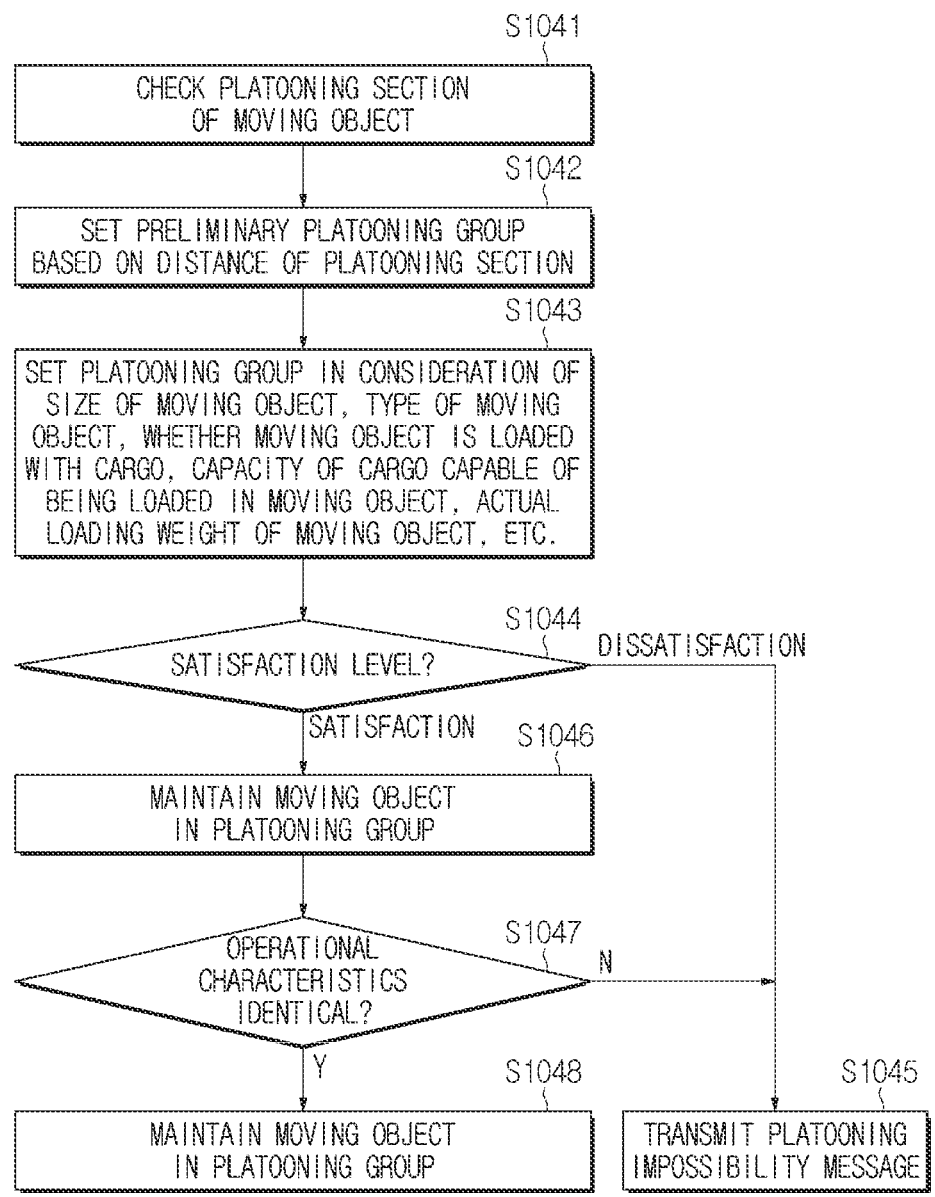
FIG. 10B is a view showing, in detail, a platooning group setting operation of an intelligent transportation system infrastructure for performing platooning, according to an embodiment of the present invention.

FIG. 10B is a view showing, in detail, a platooning group setting operation of a first intelligent transportation system infrastructure for performing platooning, according to an embodiment of the present invention.

Although, in an embodiment of the present disclosure, platooning operation by the first intelligent transportation system infrastructure is illustrated, the present disclosure is not limited thereto and platooning may be performed by any one of the first to fourth intelligent transportation system infrastructures or the server device connected to the first to fourth intelligent transportation system infrastructures.

Referring to FIG. 10B, the first intelligent transportation system infrastructure may check the moving path information received from the moving object, and the moving path information may include information on the first intelligent transportation system infrastructure existing in the path between the departure point and the destination, along with information on the departure point and the destination. Based on this, the first intelligent transportation system infrastructure may check a platooning section with respect to each moving object based on the first intelligent transportation system infrastructure existing in the path between the departure point and the destination (S1041).

Thereafter, the first intelligent transportation system infrastructure may set a preliminary platooning group based on the platooning section (S1042). Specifically, the first intelligent transportation system infrastructure may check the platooning section of each moving object, check a distance of an identical platooning section, and extract moving objects whose distance of the identical platooning section exceeds a predetermined threshold (e.g., 100 km, 150 km, 200 km, etc.) as a preliminary platooning group. As another example, the first intelligent transportation system infrastructure may sort distances of the identical platooning section in descending order and extract and configure a predetermined number (e.g., 7, 10, etc.) of moving objects having a relatively large distance of the identical platooning section as a preliminary platooning group.

For stable operation of platooning, it is necessary to consider the traveling characteristics (e.g., speed, acceleration performance on flatland, acceleration performance on slope, etc.) or braking characteristics (e.g., braking distance) of the moving object. Based on this, the first intelligent transportation system infrastructure may set the platooning group in consideration of the size (e.g., length, width, etc.) of the moving object, the type of the moving object (e.g., Click®, Avante®, Sonata®, Grandeur®, Genesis®, Porter®, Starex®, Tucson®, Santa Fe®, Palisade®, Megatruck®, New Power Truck®, etc.), whether the moving object is loaded with cargo, the capacity of the cargo capable of being loaded in the moving object, the actual weight of the cargo loaded in the moving object (S1043). Specifically, the first intelligent transportation system infrastructure may extract moving objects having characteristic values in the same or predetermined similar range in consideration of the size of the moving object, the type of the moving object, whether the moving object is loaded with cargo, the capacity of the cargo capable of being loaded in the moving object, the actual weight of the cargo loaded in the moving object, etc. and set a platoon group.

Further, the platooning group may include a leader moving object leading platooning and at least one following moving object following the leader moving object. The first intelligent transportation system infrastructure may set the platooning group by further considering the characteristics of the leader moving object and the following moving object. For example, the first intelligent transportation system infrastructure may collect satisfaction information of platooning from the moving object, check the collected satisfaction information, and determine whether there is satisfaction information of the leader moving object and the following moving object. When there is satisfaction information of the leader moving object and the following moving object, it is determined whether the checked satisfaction information indicates satisfaction or dissatisfaction with platooning (S1044), and the moving object may be removed from or maintained in the platooning group according to the result of determination (S1045, S1046, respectively). That is, when the satisfaction information indicates dissatisfaction with platooning, for example, when satisfaction information is less than a predetermined threshold, the first intelligent transportation system infrastructure may remove the following moving object from the platooning group (S1045). On the other hand, when the satisfaction information indicates satisfaction with platooning, for example, when satisfaction information exceeds the predetermined threshold, the first intelligent transportation system infrastructure may maintain the platooning group (S1046).

Additionally, the first intelligent transportation system infrastructure may check operation characteristics of the leader moving object and the following moving object (or the user or driver who uses the moving object) (S1047), and release or maintain the platooning group in consideration of the checked operation characteristics (S1045, S1048, respectively). Specifically, the first intelligent transportation system infrastructure may be connected with a server (e.g., a navigation information provision server, an automobile insurance service provision server, etc.) for collecting and managing the operation characteristics of the leader moving object and the following moving object (or the user or driver who uses the moving object) to receive the operation characteristics of the leader moving object and the following moving object (or the user or driver who uses the moving object) through communication with the server for collecting and managing the operation characteristics. The first intelligent transportation system infrastructure may determine whether the operation characteristics of the leader moving object and the following moving object (or the user or driver who uses the moving object) are identical or similar. When the operation characteristics of the leader moving object and the following moving object (or the user or driver who uses the moving object) are identical or similar, the first intelligent transportation system infrastructure may maintain the platooning group (S1048). On the other hand, upon determining that the operation characteristics of the leader moving object and the following moving object (or the user or driver who uses the moving object) are different, the first intelligent transportation system infrastructure may remove the following moving object from the platooning group (S1045).

FIG. 11 is a view showing detailed operation of a moving object for performing platooning, according to an embodiment of the present invention.

Referring to FIG. 11, platooning may be set in the moving object. As a specific example, a first moving object may arrive at a destination after passing through the first intelligent transportation system infrastructure, the second intelligent transportation system infrastructure and the third intelligent transportation system infrastructure. In addition, a second moving object may arrive at a destination after passing through the first intelligent transportation system infrastructure, the second intelligent transportation system infrastructure and the fourth intelligent transportation system infrastructure. In addition, a third moving object may arrive at a destination after passing through the first intelligent transportation system infrastructure, the second intelligent transportation system infrastructure and the fourth intelligent transportation system infrastructure. At this time, for example, each moving object may pass through the first intelligent transportation system infrastructure within a preset time duration. More specifically, moving objects entering a preset range of the first intelligent transportation system infrastructure may be detected based on the time duration. For example, the first moving object and the second moving object may enter the preset range of the first intelligent transportation system infrastructure based on the same time duration, and the third moving object may enter the preset range of the first intelligent transportation system infrastructure in a different time duration. However, this is only an example and is not limited to the above-described embodiment. At this time, the moving objects may transmit the above-described moving path information based on autonomous driving to the first intelligent transportation system infrastructure. At this time, the first intelligent transportation system infrastructure may determine that platooning is possible with respect to the first moving object and the second moving object included in the same time duration, and transmit information thereon to the first moving object and the second moving object. At this time, for example, the first intelligent transportation system infrastructure may transmit information indicating that platooning is possible and information on a range in which platooning is possible to the first moving object and the second moving object. That is, the first intelligent transportation system infrastructure may transmit, to the first moving object and the second moving object, information indicating that platooning is possible from the first intelligent transportation system infrastructure to the second intelligent transportation system infrastructure. Thereafter, the first moving object and the second moving object may form a group and perform platooning until the second intelligent transportation system infrastructure. On the other hand, the third moving object which has transmitted the moving path information in the different time duration may not check the moving object capable of platooning. At this time, the first intelligent transportation system infrastructure may transmit, to the third moving object, information indicating that platooning is impossible. Meanwhile, for example, the third moving object may travel based on autonomous driving until the second intelligent transportation system infrastructure, search for a moving object capable of platooning in the second intelligent transportation system infrastructure again, and perform platooning based on the same.

FIG. 12 is a view showing detailed operation of a moving object for performing platooning, according to an embodiment of the present invention. In traveling of the moving object based on the above description, the first moving object may travel based on existing autonomous driving from the departure point to the first intelligent transportation system infrastructure. At this time, whether platooning of the first moving object starts may be determined by the first intelligent transportation system infrastructure. For example, the first moving object may receive platooning information from the intelligent transportation system infrastructure, and perform platooning with other moving objects until the third intelligent transportation system infrastructure. Thereafter, the first moving object may perform platooning until the third intelligent transportation system infrastructure. At this time, for example, the first moving object may have a traveling path left, and determine whether additional platooning is possible. For example, the first moving object may transmit the moving path information to the third intelligent transportation system infrastructure, and receive information indicating whether platooning is possible based on the same. At this time, based on the third intelligent transportation system infrastructure, the first moving object may be instructed that platooning with another moving object is possible. At this time, for example, a path in which platooning is possible may be from the third intelligent transportation system infrastructure to the fourth intelligent transportation system infrastructure. For example, the first moving object may perform platooning from the third intelligent transportation system infrastructure to the fourth intelligent transportation system infrastructure. Thereafter, the first moving object may finish platooning in the fourth intelligent transportation system infrastructure and travel to the destination based on existing autonomous driving. That is, the moving object may set an autonomous driving path based on the intelligent transportation system infrastructure, determine whether platooning is possible based on the intelligent transportation system infrastructure, and perform platooning with another moving object.

Figure 13:
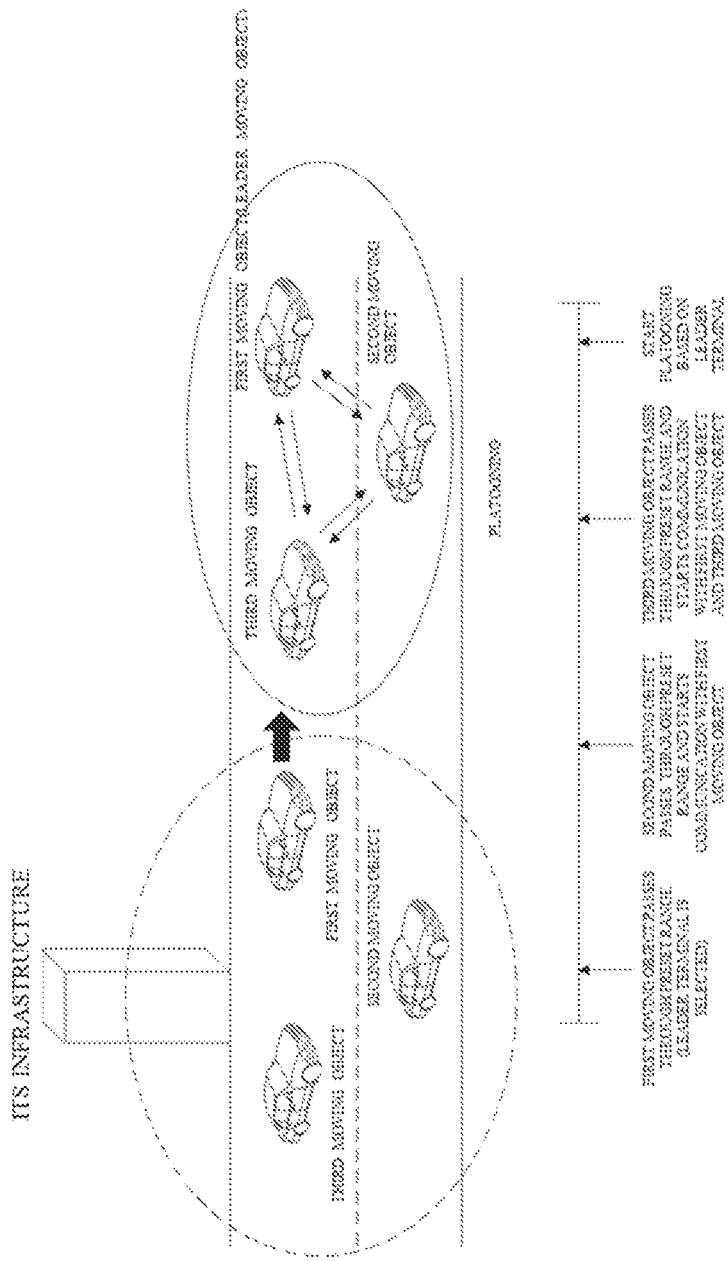
FIG. 13 is a view showing a method of forming a group of moving objects, according to an embodiment of the present invention.

FIG. 13 is a view showing a method of forming a group of moving objects, according to an embodiment of the present invention.

Referring to FIG. 13, it may be a method of selecting a leader in a moving object performing platooning. For example, based on the intelligent transportation system infrastructure, a group capable of platooning may be determined. At this time, for example, in FIG. 13, the first moving object, the second moving object and the third moving object may be set as a group for platooning. At this time, each moving object may receive information on platooning from the intelligent transportation system infrastructure. Thereafter, the first moving object which is a leading moving object may pass through the preset range of the intelligent transportation system infrastructure. For example, a moving object which has first passed through the preset range of the intelligent transportation system infrastructure among the moving objects in the group for performing platooning may be the leader moving object. Thereafter, the second moving object may pass through the preset range of the intelligent transportation system infrastructure, and a moving object which has subsequently passed through the preset range of intelligent transportation system infrastructure after setting the leader moving object may be set as the following moving object. At this time, the leader moving object or the following moving object may be determined by the intelligent transportation system infrastructure. Although, in an embodiment of the present disclosure, all moving objects may be configured to function as the leader of platooning and the intelligent transportation system infrastructure determines the leader moving object in consideration of the order of passing through the preset range of the intelligent transportation system infrastructure, the present disclosure is not limited thereto. As another example, the moving objects may be divided into moving objects capable of functioning as the leader and moving objects incapable of functioning as the leader. Based on this, the intelligent transportation system infrastructure may first determine whether the moving object is capable of functioning as the leader and determine, as the leader moving object, the moving object capable of functioning as the leader. At this time, when there is a plurality of moving objects capable of functioning as the leader in the group for platooning, the intelligent transportation system infrastructure may determine a moving object which has first passed through the preset range of the intelligent transportation system infrastructure as the leader moving object. In addition, the intelligent transportation system infrastructure may set the remaining moving objects except for the leader moving object in the group for platooning as the following moving object. Meanwhile, when there is not a moving object capable of functioning as the leader in the group for platooning, the operation of forming the group of moving objects may be finished.

Meanwhile, when exceeding the preset range of the intelligent transportation system infrastructure, communication between the moving object and the intelligent transportation system infrastructure may not be smooth. At this time, for example, the second moving object may perform communication with the first moving object based on information received from the intelligent transportation system infrastructure. That is, in order to check the group for platooning, the second moving object may perform communication with the first moving object. In addition, the third moving object may pass through the preset range of the intelligent transportation system infrastructure. At this time, for example, the third moving object may perform communication with the first moving object based on the information received from the intelligent transportation system infrastructure. That is, in order to check the group for platooning, the third moving object may perform communication with the first moving object which is the leader moving object. In addition, the third moving object may perform communication with the second moving object, without being limited to the above-described embodiment. At this time, for example, based on the above description, platooning may be performed based on the first moving object which is the leader moving object. For example, platooning may be performed until a path which is commonly set based on the moving path information of the first moving object, the second moving object and the third moving object, as described above.

Although, in an embodiment of the present disclosure, the platooning group is set based on the moving path information of the moving object, for example, a destination, a waypoint, etc., the present disclosure is not limited thereto and may be variously changed.

Figure 14:
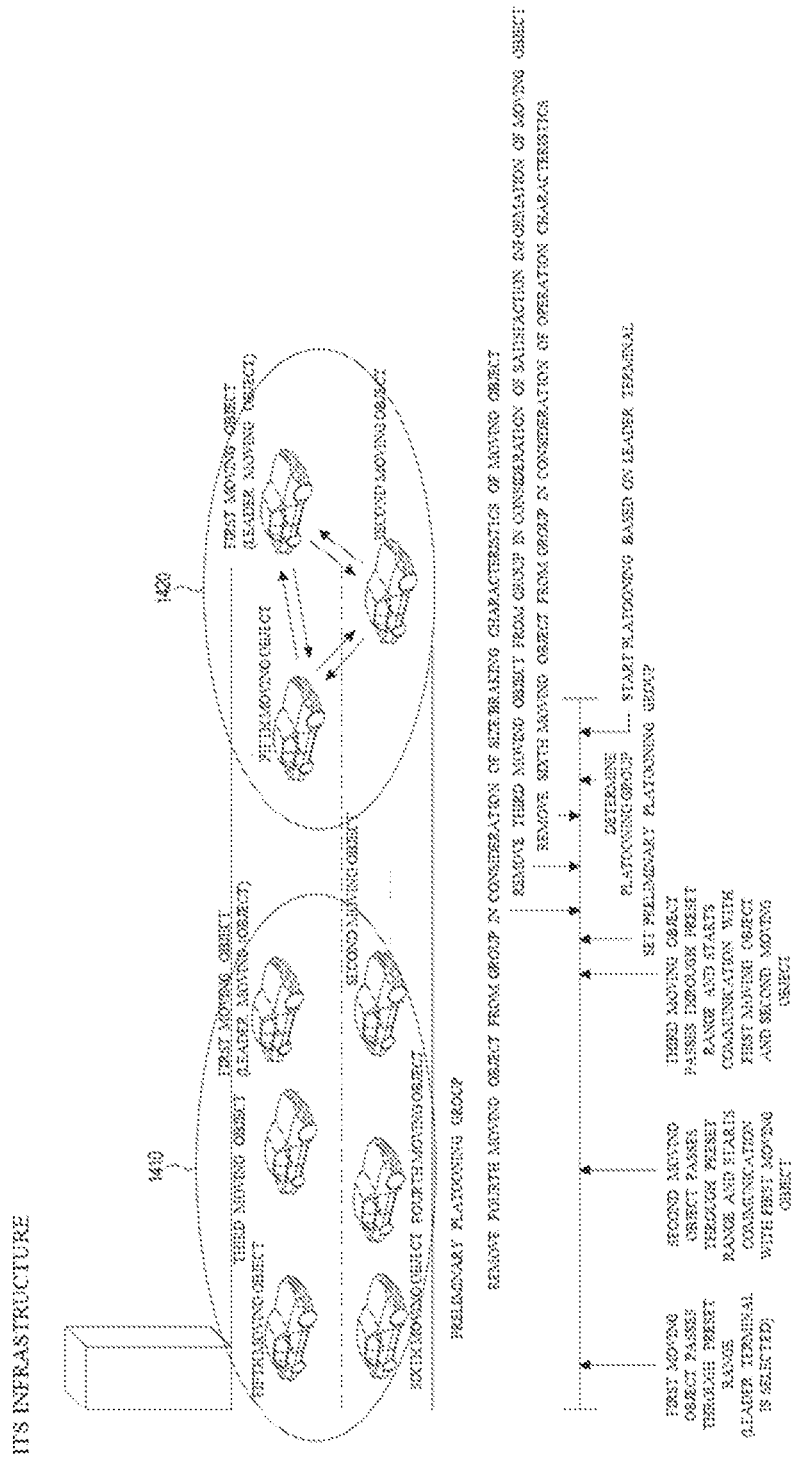
FIG. 14 is a view showing another example of a method of forming a group of moving objects, according to an embodiment of the present invention.

For stable operation of platooning, it is necessary to consider the traveling characteristics (e.g., speed, acceleration performance on flatland, acceleration performance on slope, etc.) or braking characteristics (e.g., braking distance) of the moving object. Based on this, the intelligent transportation system infrastructure may set the platooning group in consideration of the size (e.g., length, width, etc.) of the moving object, the type of the moving object (e.g., Click®, Avante®, Sonata®, Grandeur®, Genesis®, Porter®, Starex®, Tucson®, Santa Fe®, Palisade®, Megatruck®, New Power Truck®, etc.), whether the moving object is loaded with cargo, the capacity of the cargo capable of being loaded in the moving object, and the actual weight of the cargo loaded in the moving object. For example, the intelligent transportation system infrastructure may basically set a preliminary platooning group 1410 (see FIG. 14) based on the moving path information of the moving object, and set a final platooning group 1420 by maintaining or removing moving objects included in the preliminary platooning group in consideration of the size of the moving object, the type of the moving object, whether the moving object is loaded with cargo, the capacity of the cargo capable of being loaded in the moving object, the actual weight of the cargo loaded in the moving object, etc.

Further, the intelligent transportation system infrastructure may collect satisfaction information of platooning from the moving object, check the collected satisfaction information, and maintain or remove the moving objects included in the preliminary platooning group based on the satisfaction information of the moving objects included in the preliminary platooning group. That is, when the checked satisfaction information indicates dissatisfaction with platooning, for example, when the satisfaction information is less than or equal to a predetermined threshold, the intelligent transportation system infrastructure may remove the following moving object from the preliminary platooning group. On the other hand, when the checked satisfaction information indicates satisfaction with platooning, for example, when the satisfaction information exceeds the predetermined threshold, the intelligent transportation system infrastructure may maintain the platooning group.

Additionally, the intelligent transportation system infrastructure may check operation characteristics from a server (e.g., a navigation information provision server, an automobile insurance service provision server, etc.) for collecting and managing the operation characteristics of the moving object (or the user or driver who uses the moving object) and reset the platooning group based on whether the operation characteristics of the moving object (or the user or driver who uses the moving object) are identical or similar.

According to embodiments of the present invention, it is possible to provide a method and apparatus for performing platooning of the moving object.

According to embodiments of the present invention, it is possible to provide a method and apparatus for performing platooning of the moving object based on an intelligent transportation system infrastructure.

According to embodiments of the present invention, it is possible to provide a method and apparatus for performing platooning of the moving object through autonomous driving based on an intelligent transportation system infrastructure.

Figure 15:
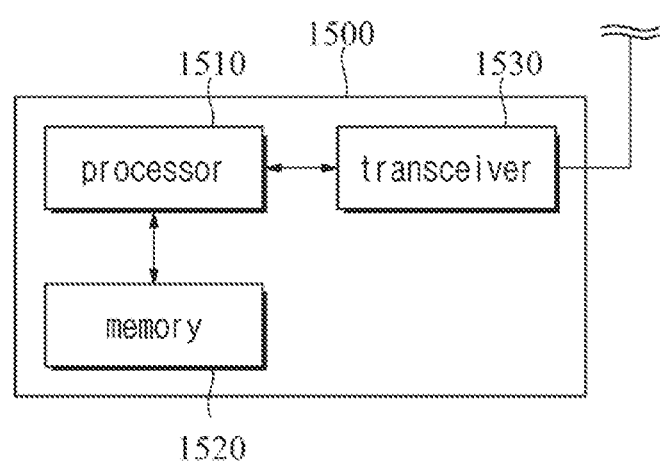
FIG. 15 is a view showing the configuration of a device, according to an embodiment of the present invention.

FIG. 15 is a view illustrating an apparatus configuration. Referring to FIG. 15, an apparatus may include at least one or more among the above-described moving object, a device, a server and an RSU. In other words, an apparatus may communicate and work with another device, which is not limited to the above-described embodiment. For example, for the above-described operation, an apparatus 1500 may include at least one of a processor 1510, a memory 1520, and a transceiver 1530. In other words, an apparatus may include a necessary configuration for communicating with another apparatus. In addition, for example, an apparatus may include another configuration apart from the above-described configuration. In other words, an apparatus may have a configuration, which includes the above-described apparatus for communicating with another device but is not limited thereto, and may be operated based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to an embodiment of the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays, a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. The one or more application specific integrated circuits (ASICs), the digital signal processor (DSP), the digital signal processing device (DSPD), the programmable logic device (PLD), the field programmable gate array, the processor, the controller, the microcontroller, or the microprocessor may be configured to execute the software or machine-executable instructions to perform the above-described operations so as to control the display device, the airbag module, and/or other elements.

What is claimed is:

1. A method of performing autonomous driving based on platooning by a moving object, the method comprising:
   setting a moving path;
   determining whether platooning is allowed;
   transmitting moving path information to a first intelligent transportation system infrastructure when the moving object of a plurality of moving objects approaches a preset range of the first intelligent transportation system infrastructure;
   receiving platooning information from the first intelligent transportation system infrastructure; and
   performing platooning based on the platooning information,
   wherein the first intelligent transportation system infrastructure sets a preliminary platooning group capable of platooning from among the plurality of moving objects based on the moving path information received from each of the plurality of moving objects and sets a platooning group in consideration of traveling characteristics or braking characteristics of moving objects in the preliminary platooning group, satisfaction information of a user using the moving object for the platooning and operation characteristics of driver corresponding to each of the moving objects in the preliminary platooning group;
   wherein the first intelligent transportation system infrastructure sets a time duration in which the moving path information is received; and performs the platooning grouping based on the moving objects which have transmitted the moving path information within the time duration,
   wherein the time duration is differently set based on a driving speed of the moving object within a preset distance range of the first intelligent transportation system infrastructure;
   wherein the satisfaction information is information that indicates a level of satisfaction with the platooning by the user; and
   wherein the first intelligent transportation system infrastructure sets the platooning group in consideration of the satisfaction information by:
      excluding the moving object representing dissatisfaction from the preliminary platooning group when the satisfaction information indicates the dissatisfaction with platooning; and
      keeping the moving object representing satisfaction in the preliminary platooning group when the satisfaction information indicates the satisfaction with platooning.

2. The method of claim 1, wherein the platooning is performed from the first intelligent transportation system infrastructure to a common path of the grouped moving objects.

3. The method of claim 2, wherein, when the moving object performs platooning from the first intelligent transportation system infrastructure to a second intelligent transportation system infrastructure based on the platooning information, the moving object performs platooning with another moving object based on the second intelligent transportation system infrastructure.

4. The method of claim 1, wherein, when a group for platooning is set based on the first intelligent transportation system infrastructure, the moving object which has first transmitted the moving path information to the first intelligent transportation system infrastructure based on a preset point in time is selected as a leader moving object of the group.

5. The method of claim 4, wherein:
   transmitting the moving path information to the first intelligent transportation system infrastructure comprises providing the first intelligent transportation system infrastructure with type information of the moving object for determining whether it is possible to lead platooning; and
   the type information of the moving object includes information for identifying the moving objects of a first type capable of functioning as the leader and the moving objects of a second type incapable of functioning as the leader.

6. The method of claim 5, wherein, among the moving objects of the first type, the moving object which has first transmitted the moving path information is selected as the leader moving object of the group.

7. The method of claim 4, wherein at least one of the moving objects existing in a predetermined time or distance range is grouped based on the first intelligent transportation system infrastructure.

8. The method of claim 1, wherein, when a group for platooning is set based on the first intelligent transportation system infrastructure, the moving object which has first passed through the preset range of the first intelligent transportation system infrastructure is selected as a leader moving object.

9. The method of claim 1, wherein:
when a group for platooning is set based on the first intelligent transportation system infrastructure, a plurality of the moving objects included in the group receives group identifier information from the first intelligent transportation system infrastructure; and
communication between the moving objects in the group is performed based on the group identifier information.

10. The method of claim 1, wherein the moving object generates and provides the moving path information including at least one of size characteristics of the moving object, a loading weight, an autonomous driving level or the braking characteristics.

11. The method of claim 1, further comprising:
providing an environment in which the satisfaction information of platooning is capable of being input; and
receiving and storing or transmitting the satisfaction information of the platooning to the first intelligent transportation system infrastructure.

12. The method of claim 11, further comprising receiving a result of grouping the moving objects capable of platooning in consideration of the satisfaction information of the platooning.

13. A moving object for performing autonomous driving based on platooning, the moving object comprising:
a transceiver configured to transmit and receive a signal; and
a processor configured to control the transceiver, wherein the processor is configured to:
set a moving path;
determine whether platooning of the moving object is allowed;
transmit moving path information to a first intelligent transportation system infrastructure when the moving object approaches a preset range of the first intelligent transportation system infrastructure;
receive platooning information from the first intelligent transportation system infrastructure; and
perform platooning based on the platooning information,
wherein the first intelligent transportation system infrastructure is configured to receive moving path information from a plurality of moving objects passing through the first intelligent transportation system infrastructure and group those moving objects capable of platooning from among the plurality of moving objects based on acceleration performance on slope, satisfaction information of a user using the moving object for the platooning, and operation characteristics of driver corresponding to each of the moving objects and the moving path information received from each of the plurality of moving objects;
wherein the first intelligent transportation system infrastructure sets a time duration in which the moving path information is received; and performs a platooning grouping based on the moving objects which have transmitted the moving path information within the time duration,
wherein the time duration is differently set based on a driving speed of the moving object within a preset distance range of the first intelligent transportation system infrastructure;
wherein the satisfaction information is information that indicates a level of satisfaction with the platooning input by the user; and
wherein the first intelligent transportation system infrastructure is configured to group those moving objects capable of platooning from among the plurality of moving objects based by:
excluding the moving object representing dissatisfaction from a preliminary platooning group when the satisfaction information indicates the dissatisfaction with platooning, and
keeping the moving object representing satisfaction in the preliminary platooning group when the satisfaction information indicates the satisfaction with platooning.

14. A method of controlling a moving object for performing autonomous driving by an intelligent transportation system infrastructure based on platooning, the method comprising:
receiving moving path information from a plurality of moving objects approaching within a preset range;
checking a group of the plurality of moving objects capable of platooning based on the received moving path information; and
transmitting platooning information of the group of the plurality of moving objects capable of platooning, wherein the plurality of moving objects capable of platooning travel is based on platooning information of the intelligent transportation system infrastructure so that platooning is performed based on the platooning information,
wherein the method further comprises setting a preliminary platooning group capable of platooning from among the plurality of moving objects based on the received moving path information and setting a platooning group in consideration of traveling characteristics and satisfaction information of user using the moving object for platooning in the preliminary platooning group and operation characteristics of driver corresponding to each of the moving objects in the preliminary platooning group;
wherein the intelligent transportation system infrastructure sets a time duration in which the moving path information is received; and performs the platooning grouping based on the moving objects which have transmitted the moving path information within the time duration,
wherein the time duration is differently set based on a driving speed of the moving object within a preset distance range of the intelligent transportation system infrastructure;
wherein the satisfaction information is information that indicates a level of satisfaction with the platooning input by the user; and wherein setting the platooning group in consideration of the satisfaction information comprises:

excluding the moving object representing dissatisfaction from the preliminary platooning group when the satisfaction information indicates the dissatisfaction with platooning, and keeping the moving object representing satisfaction in the preliminary platooning group when the satisfaction information indicates the satisfaction with platooning.

15. The method of claim 14, wherein checking the group of the plurality of moving objects capable of the platooning comprises:

checking at least one of size characteristics and braking characteristics of each of the moving objects; and grouping the moving objects capable of the platooning based on at least one of the size characteristic of each of the moving objects, a loading weight, an autonomous driving level or the braking characteristics.

16. The method of claim 14, wherein checking the group of the plurality of moving objects capable of the platooning comprises:

checking a residual travel distance of each of the moving objects; and grouping the moving objects capable of the platooning based on the residual travel distance of each of the moving objects.

17. The method of claim 14, wherein checking the group of the plurality of moving objects capable of the platooning comprises:

checking a traffic congestion degree of an area in which each of the moving objects moves; and determining a size of the platooning group capable of the platooning based on the traffic congestion degree.

* * * * *